(12) United States Patent
Compaan et al.

(10) Patent No.: US 11,962,267 B2
(45) Date of Patent: Apr. 16, 2024

(54) SYSTEMS AND METHODS FOR PROVIDING ACTIVE SHADE MITIGATION FOR A SOLAR MODULE

(71) Applicant: RBI Solar, Inc., Cincinnati, OH (US)

(72) Inventors: David Compaan, Columbus, OH (US); Ben Urbanek, Cincinnati, OH (US)

(73) Assignee: RBI Solar, Inc., Cincinnati, OH (US)

( * ) Notice: Subject to any disclaimer, the term of this patent is extended or adjusted under 35 U.S.C. 154(b) by 0 days.

(21) Appl. No.: 17/322,013

(22) Filed: May 17, 2021

(65) Prior Publication Data
US 2021/0359639 A1    Nov. 18, 2021

Related U.S. Application Data

(60) Provisional application No. 63/026,231, filed on May 18, 2020.

(51) Int. Cl.
| | |
|---|---|
| *H02S 20/32* | (2014.01) |
| *F24S 30/425* | (2018.01) |
| *F24S 50/20* | (2018.01) |
| *F24S 50/80* | (2018.01) |
| *H02S 40/32* | (2014.01) |

(Continued)

(52) U.S. Cl.
CPC ............ *H02S 20/32* (2014.12); *F24S 30/425* (2018.05); *F24S 50/20* (2018.05); *F24S 50/80* (2018.05); *H02S 40/32* (2014.12); *H02S 50/00* (2013.01); *F24S 2030/13* (2018.05)

(58) Field of Classification Search
CPC ........... H02S 20/32; H02S 40/32; F24S 50/20
See application file for complete search history.

(56) References Cited

U.S. PATENT DOCUMENTS

| | | |
|---|---|---|
| 4,267,441 A | 5/1981 | Monk |
| 8,158,877 B2 | 4/2012 | Klein et al. |
| 8,624,411 B2 | 1/2014 | Schmidt et al. |

(Continued)

FOREIGN PATENT DOCUMENTS

CN          207182113 U    *    4/2018

OTHER PUBLICATIONS

CN-207182113-U English Translation as provided by FIT database, translated on Aug. 10, 2023.*

(Continued)

*Primary Examiner* — Golam Mowla
(74) *Attorney, Agent, or Firm* — Wood Herron & Evans LLP

(57) ABSTRACT

A solar tracker includes a rotatable portion including a plurality of solar modules, at least a portion of each of the modules being arranged in a row and electrically coupled to each other in series to define at least one string. A motor is operatively coupled to the rotatable portion and configured to supply torque to the rotatable portion for rotating the rotatable portion about an axis. At least one electrical characteristic sensor and at least one controller are in operative communication with the motor and with the at least one electrical characteristic sensor. The at least one controller is configured to instruct the motor to supply torque to the rotatable portion in response to one or more signals received by the at least one controller from the at least one electrical characteristic sensor. A method of operating a solar tracking system is also disclosed.

9 Claims, 20 Drawing Sheets

(51) Int. Cl.
*H02S 50/00* (2014.01)
*F24S 30/00* (2018.01)

(56) References Cited

U.S. PATENT DOCUMENTS

| | | |
|---|---|---|
| 8,671,930 B2 | 3/2014 | Liao |
| 8,922,185 B2 | 12/2014 | Ehlmann et al. |
| 9,362,752 B2 | 6/2016 | Yun |
| 9,397,611 B2 | 7/2016 | Judkins et al. |
| 9,553,215 B2 | 1/2017 | Ammer et al. |
| 9,608,560 B2 | 3/2017 | Luo |
| 9,710,005 B2 | 7/2017 | Johnston et al. |
| 9,728,656 B2 | 8/2017 | Vatelmacher et al. |
| 11,360,492 B2 | 6/2022 | Lee et al. |
| 2011/0094563 A9 | 4/2011 | Baker et al. |
| 2012/0235017 A1 | 9/2012 | Scanlon et al. |
| 2014/0053890 A1 | 2/2014 | Yang |
| 2015/0097533 A1 | 4/2015 | Chung et al. |
| 2015/0162871 A1 | 6/2015 | Rock |
| 2015/0236182 A1 | 8/2015 | Moslehi |
| 2015/0377518 A1 | 12/2015 | Maxey et al. |
| 2016/0226439 A1 | 8/2016 | Gibson |
| 2016/0336900 A1 | 11/2016 | Paponneau et al. |
| 2017/0077869 A1 | 3/2017 | Catthoor et al. |
| 2017/0187192 A1 | 6/2017 | Jeanty et al. |
| 2017/0353150 A1 | 12/2017 | Alon et al. |
| 2018/0006464 A1* | 1/2018 | Judkins ............. H02S 40/32 |

OTHER PUBLICATIONS

Nextracker Inc., Unlock your potential with TrueCapture, MKT-000062, nextracker.com, Brochure not dated, (2 pages).

Corosolar, TechTrack Distributed Single-Axis Tracking Systems, https://www.corosolar.com/TechTrack-Distributed, retrieved on May 17, 2021 (1 page).

Mohapatra et al., A review on MPPT techniques of PV system under partial shading condition, Renewable and Sustainable Energy Reviews, 80 (2017) 854-867, https://www.researchgate.net/publication/317326775_Areview_on_MPPT_techniques_of_PV_system_under_partial_shading_condition.

Koutroulis, A New Technique for Tracking the Global Maximum Power Point of PV Arrays Operating under Partial Shading Conditions, retrieved from http//vbn.aau.dk/ws/files/80476709/a_new_technique_for_tracking_the_global_maximum_power_point.pdf, retrieved on May 17, 2021 (7 pages).

Chowdhury, et al., Maximum power point tracking of partially shaded solar photovoltaic arrays, Solar Energy Materials & Solar Cells, 94 (2010) 1441-1447, retrieved from http://iranarze.ir/wp-content/uploads/2017/02/6120-English-IranArze.pdf.

\* cited by examiner

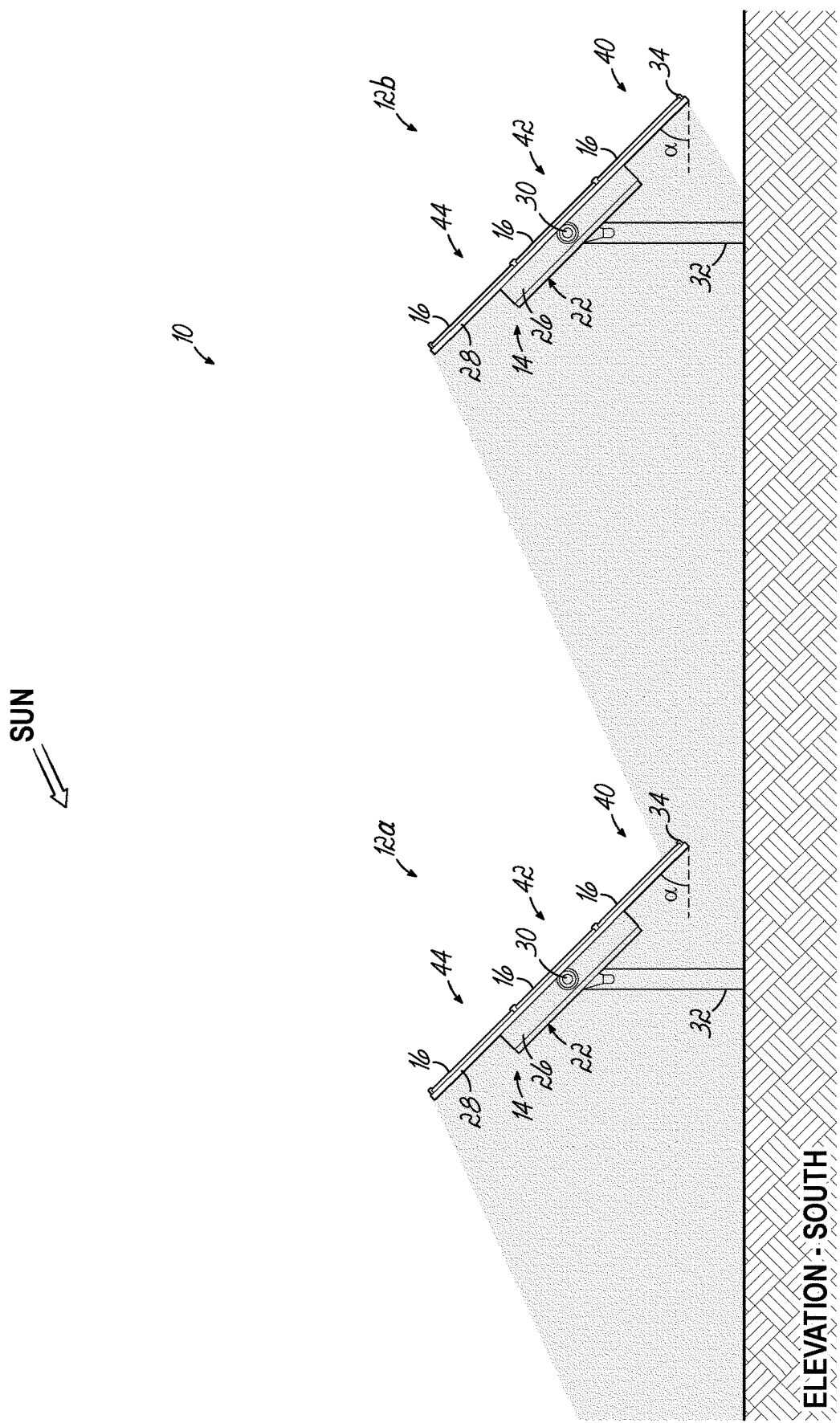

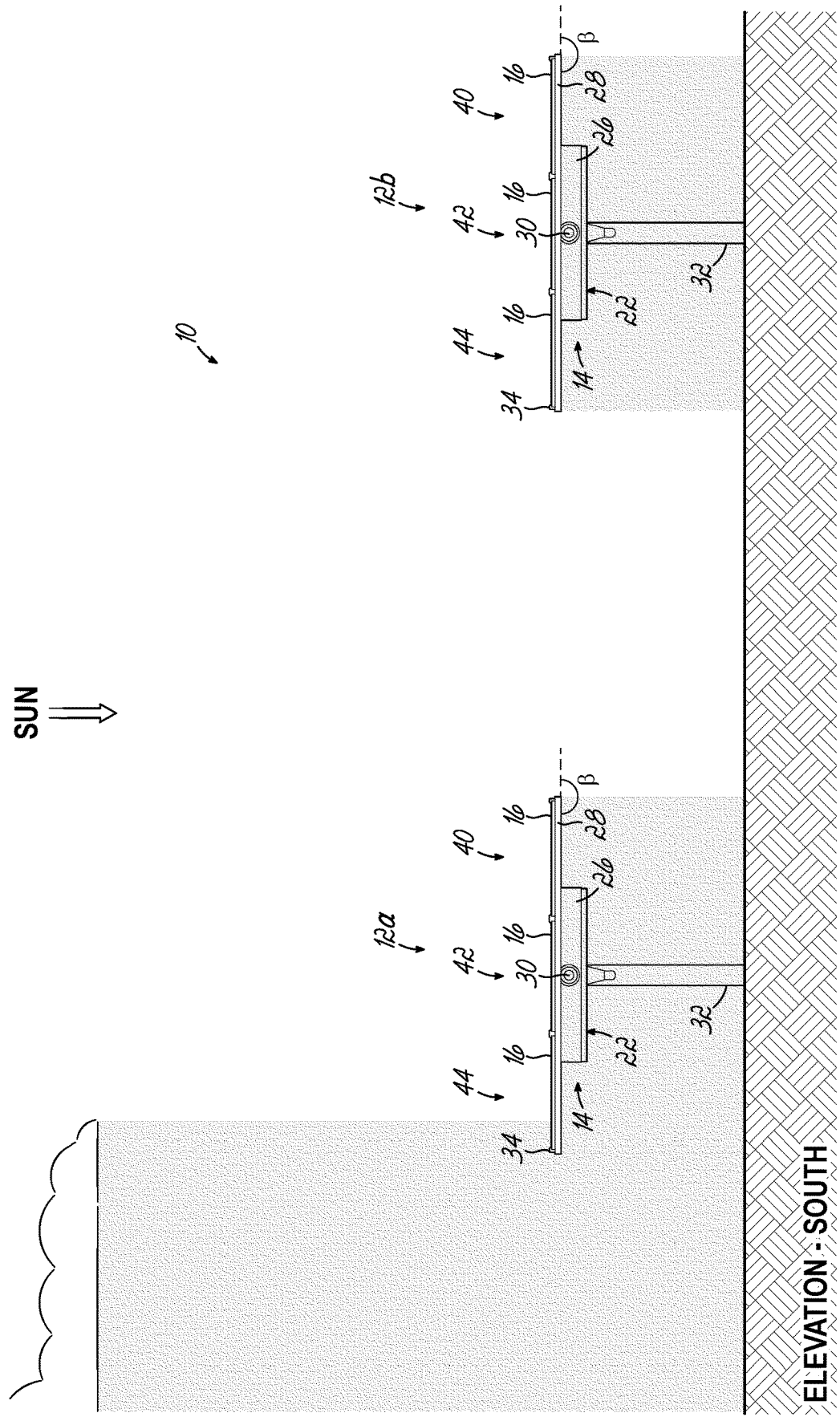

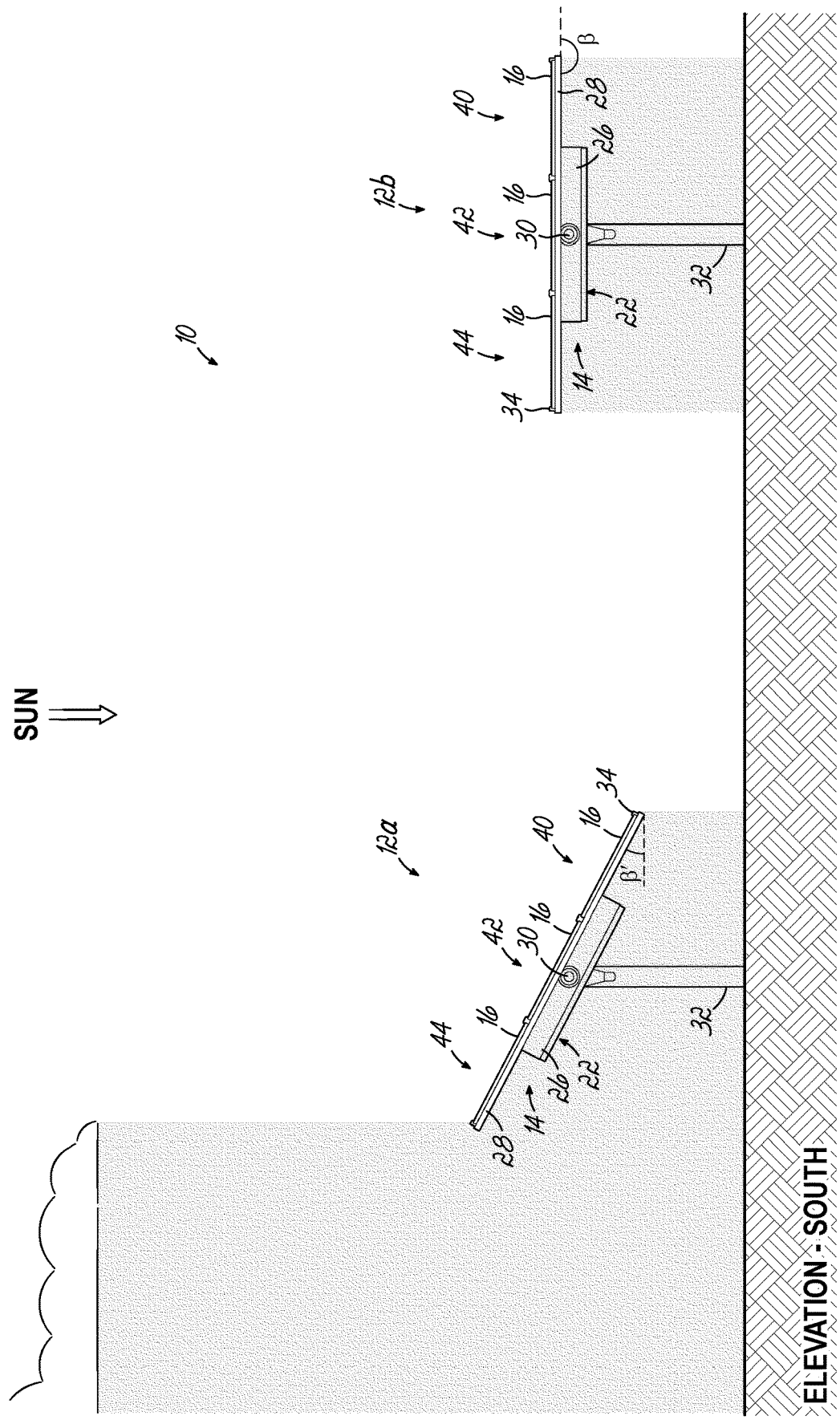

SYSTEMS AND METHODS FOR PROVIDING ACTIVE SHADE MITIGATION FOR A SOLAR MODULE

CROSS-REFERENCE TO RELATED APPLICATION

The present application claims the filing benefit of U.S. Provisional Application Ser. No. 63/026,231, filed on May 18, 2020, the disclosure of which is incorporated herein by reference in its entirety.

FIELD OF THE INVENTION

The present application relates generally to shade mitigation for solar modules. More specifically, the present application describes systems and methods for actively mitigating shading of solar modules.

BACKGROUND OF THE INVENTION

Solar modules are an integral part of photovoltaic (PV) or solar power systems and are primarily used to absorb sunlight which is subsequently converted by the system into electricity. Solar modules are commonly mounted in an array in a fixed position, such as a horizontal position or a tilted position. However, such solar module arrays may only receive direct sunlight during limited portions of the day due to the relative movement of the sun across the sky from east to west. When the solar module arrays receive indirect sunlight, the electrical output of the arrays may be significantly reduced as compared to direct sunlight.

Solar tracking systems may be used to adjust the orientation of one or more solar module arrays toward the sun in an effort to minimize the angle of incidence between the incoming sunlight and each solar module in the array. For example, a single axis tracker may include a plurality of solar modules mounted to one or more rotatable tables linked together by a driveshaft. The driveshaft may define an axis of rotation which may be aligned along a true North meridian so that the tables, and thus the arrays, may be rotated about the axis to track the east-west travel of the sun.

Most conventional solar tracking systems operate independent of the solar power production system and utilize passive backtracking to determine a desired orientation of the solar module array at a particular day and time. Such systems typically base the desired orientation on algorithms using passive setpoints, such as Global Positioning System (GPS) data, time, and date to determine a theoretical optimum orientation of the solar module array for receiving maximum sunlight and adjust the orientation of the array accordingly. For example, such systems may determine that a module array at a particular location on a particular day should be tilted at certain angles at various times throughout the day in order to receive maximum sunlight and may continuously and slowly rotate the array through an arc-shaped path to achieve the desired orientations. However, such systems fail to adequately account for various real-time factors which significantly impact the amount of sunlight actually received by the solar modules. For example, various obstructions such as cloud cover may cast shade onto individual modules. Shading effectively acts as a resistor and reduces the electrical output of the solar module. Conventional solar tracking systems do not address shading caused by cloud cover.

Shading can also be caused by snow accumulation on the modules. Some solar tracking systems respond to snow accumulation by using conventional snow shedding techniques which are based largely on conjecture. For example, when a snow event is detected (e.g., by an infrared snow sensor configured to detect a distance to the ground or top of accumulated snow), the tracking system may simply tilt the solar module array to a maximum tilt angle for a predetermined duration (e.g., one hour) in an effort to shed the snow from the modules. However, the predetermined duration may be longer than necessary, such that the modules are held at the maximum tilt angle and receive a below-optimal amount of sunlight for more time than required. On the other hand, the predetermined duration may be shorter than necessary, such that snow accumulation may remain on the modules and continue to shade the modules when the modules are returned to a normal operating position from the maximum tilt position. Lingering snow accumulation on the modules may also create an excess load on the modules which could damage the modules or other system components during rotation of the modules.

Moreover, the tracking system itself can cause shading problems. In this regard, as the modules move during the course of the day, certain modules may cast shade on other modules due to profile angle effects. For example, a relatively eastern row of modules may cast shade on a relatively western row of modules early in the morning when the sun is near the eastern horizon, and the relatively western row of modules may cast shade on the relatively eastern row of modules late in the evening when the sun is near the western horizon. Some solar tracking systems adjust all of the modules to a horizontal or flat position during certain portions of the day, such as early in the morning and/or late in the evening when the sun is near the horizon, to prevent the modules from casting shade onto each other. However, this technique causes all of the modules to receive only indirect sunlight during these time periods and thereby results in reduced electrical output. Similar to conventional snow shedding techniques, this technique may also overcompensate or undercompensate for the actual shading.

Thus, it would be desirable to provide systems and methods to provide improved mitigation of shading of solar module arrays, thereby to improve the electrical output of solar module arrays.

SUMMARY OF THE INVENTION

In one embodiment, a solar tracker includes a rotatable portion including a plurality of solar modules, at least a portion of each of the modules being arranged in a row and electrically coupled to each other in series to define at least one string. The tracker also includes a motor operatively coupled to the rotatable portion and configured to supply torque to the rotatable portion for rotating the rotatable portion about an axis. The tracker further includes at least one electrical characteristic sensor and at least one controller in operative communication with the motor and with the at least one electrical characteristic sensor. The at least one controller is configured to instruct the motor to supply torque to the rotatable portion in response to one or more signals received by the at least one controller from the at least one electrical characteristic sensor. In one embodiment, the at least one electrical characteristic sensor is configured to detect at least one electrical characteristic of the at least one string. In addition or alternatively, the at least one electrical characteristic sensor may include at least one of a voltage sensor or a current sensor. For example, the solar tracker may further include at least one solar power inverter electrically coupled to the at least one string and configured to change a current output of the at least one string from direct current (DC) to alternating current (AC), and the at least one solar power inverter may include the at least one of a voltage sensor or a current sensor.

The at least one string may include a first string and a second string. In one embodiment, the at least one electrical characteristic sensor includes a first electrical characteristic sensor configured to detect a first electrical characteristic of the first string and a second electrical characteristic sensor configured to detect a second electrical characteristic of the second string, and the at least one controller is configured to perform a comparison of the detected first and second electrical characteristics and to instruct the motor to supply torque to the rotatable portion in response to the comparison.

The solar tracker may further include at least one sunlight intensity sensor configured to detect a sunlight intensity proximate the at least one string, and the at least one controller may be configured to perform a comparison of the detected electrical characteristic and the detected sunlight intensity and to instruct the motor to supply torque to the rotatable portion in response to the comparison. For example, the at least one sunlight intensity sensor may include an irradiance sensor.

The rotatable portion may further include a table, and the plurality of solar modules may be mounted on the table. The table may include a driveshaft defining the axis, and the motor may be operatively coupled to the driveshaft and configured to supply torque to the driveshaft for rotating the table about the axis.

In another embodiment, a solar tracking system includes a first solar tracker having a first rotatable portion including a first plurality of solar modules, at least a portion of each of the modules of the first plurality of modules being arranged in a first row and electrically coupled to each other in series to define at least one first string. The first solar tracker also includes a first motor operatively coupled to the first rotatable portion and configured to supply torque to the first rotatable portion for rotating the first rotatable portion about a first axis, and at least one first sensor configured to detect at least one first electrical characteristic of the at least one first string. The solar tracking system further includes a second solar tracker positioned substantially parallel to the first solar tracker and having a second rotatable portion including a second plurality of solar modules, at least a portion of each of the modules of the second plurality of modules being arranged in a second row and electrically coupled to each other in series to define at least one second string. The second solar tracker also includes a second motor operatively coupled to the second rotatable portion and configured to supply torque to the second rotatable portion for rotating the second rotatable portion about a second axis, and at least one second sensor configured to detect at least one second electrical characteristic of the at least one second string. The solar tracking system further includes at least one controller in operative communication with the first and second motors and with the at least one first and second sensors. The at least one controller is configured to instruct at least one of the first or second motors to supply torque to the respective first or second rotatable portion in response to one or more signals received by the at least one controller from the at least one first or second sensor.

The at least one controller may be configured to instruct the first motor to supply torque to the first rotatable portion in response to one or more signals received by the at least one controller from the at least one second sensor, and the at least one controller may be configured to instruct the second motor to supply torque to the second rotatable portion in response to one or more signals received by the at least one controller from the at least one first sensor. In addition or alternatively, the at least one controller may be configured to instruct the first motor to supply torque to the first rotatable portion in response to one or more signals received by the at least one controller from the at least one first sensor, and the at least one controller may be configured to instruct the second motor to supply torque to the second rotatable portion in response to one or more signals received by the at least one controller from the at least one second sensor.

In yet another embodiment, a method is provided of operating a solar tracking system including a first solar tracker having a first rotatable portion including a first plurality of solar modules, at least a portion of each of the modules of the first plurality of modules being arranged in a first row and electrically coupled to each other in series to define at least one first string, and a second solar tracker having a second rotatable portion including a second plurality of solar modules, at least a portion of each of the modules of the second plurality of modules being arranged in a second row and electrically coupled to each other in series to define at least one second string. The method includes detecting at least one electrical characteristic of at least one of the first or second strings, and rotating at least one of the first or second rotatable portions in response to the detected at least one electrical characteristic.

Detecting at least one electrical characteristic of the at least one string may include detecting at least one of a current output, a voltage output, or a power output of at least one of the first or second strings. In addition or alternatively, detecting at least one electrical characteristic of the at least one string may include detecting at least one electrical characteristic of the at least one first string, and rotating at least one of the first or second rotatable portions may include rotating the first rotatable portion in response to the detected at least one electrical characteristic of the first string. In addition or alternatively, detecting at least one electrical characteristic of the at least one string may include detecting at least one electrical characteristic of the at least one first string, and rotating at least one of the first or second rotatable portions may include rotating the second rotatable portion in response to the detected at least one electrical characteristic of the first string.

The method may further include detecting a sunlight intensity proximate at least one of the first or second strings, performing a comparison of the detected at least one electrical characteristic and the detected sunlight intensity, and rotating at least one of the first or second rotatable portions in response to the comparison. In addition or alternatively, the method may further include detecting a snow event proximate at least one of the first or second strings, rotating at least one of the first or second rotatable portions to a snow shed position in response to the detected snow event, detecting at least one electrical characteristic of at least one of the first or second strings while in the snow shed position, and rotating at least one of the first or second rotatable portions away from the snow shed position in response to the detected at least one electrical characteristic. In addition or alternatively, the method may further include detecting a wind event proximate at least one of the first or second strings, and rotating at least one of the first or second rotatable portions to a safe stow position in response to the detected wind event.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 4 is a side elevation view of the solar tracking system of FIGS. 1A and 1B, showing the tables of both trackers tilted to face the morning sun, with the modules of the easternmost table casting shade onto the lower modules of the westernmost table.

FIG. 5 is a side elevation view of the solar tracking system of FIGS. 1A and 1B, showing the tables of both trackers flat to face noon sun, with a cloud casting shade onto a portion of the westernmost table.

FIG. 5A is side elevation view similar to FIG. 5, showing the westernmost table slightly tilted to avoid the shading from the cloud.

DETAILED DESCRIPTION OF THE INVENTION

Figure 1A:
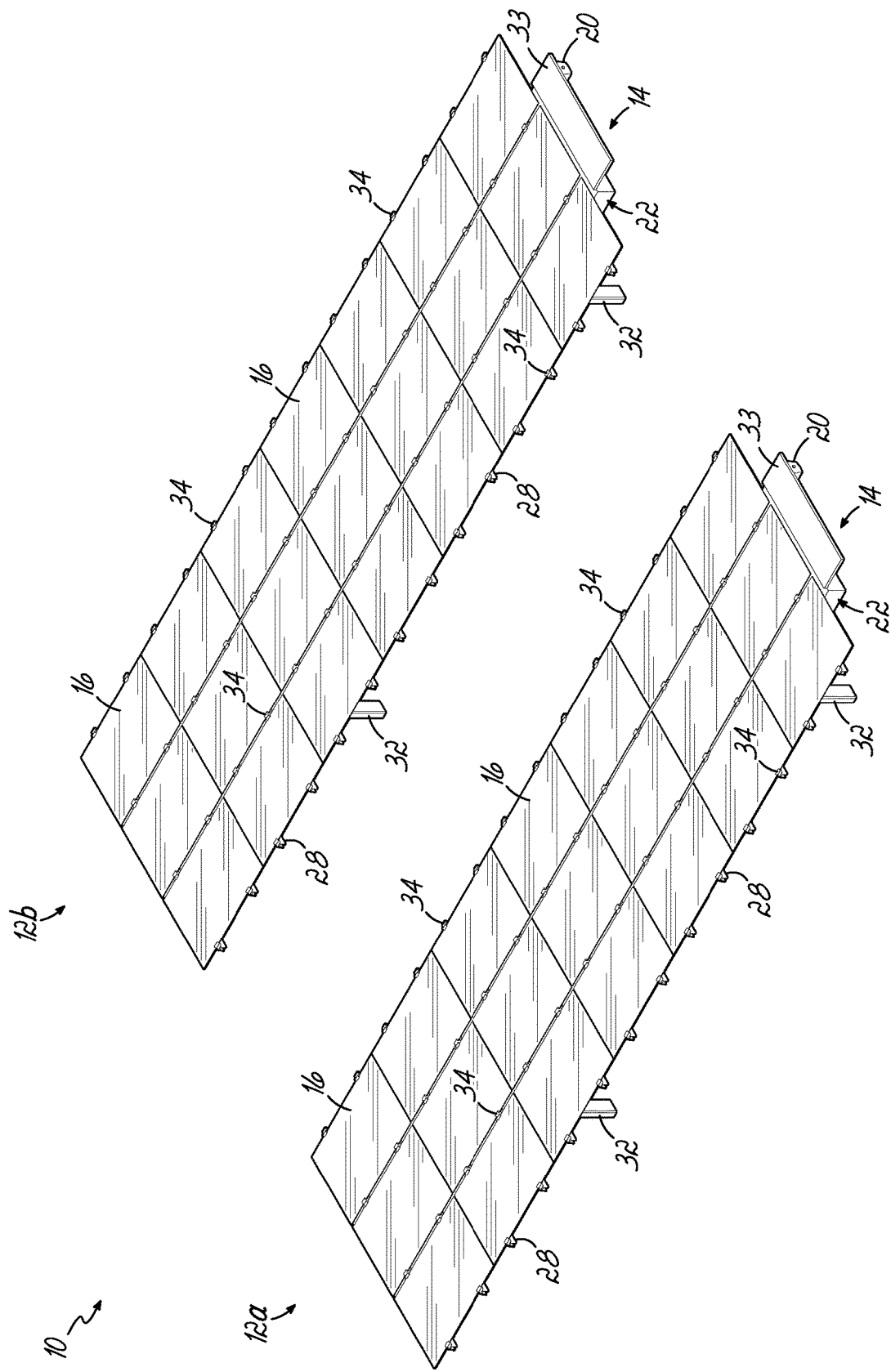
FIG. 1A is a top perspective view of a solar tracking system in accordance with one embodiment of the invention.
Figure 1B:
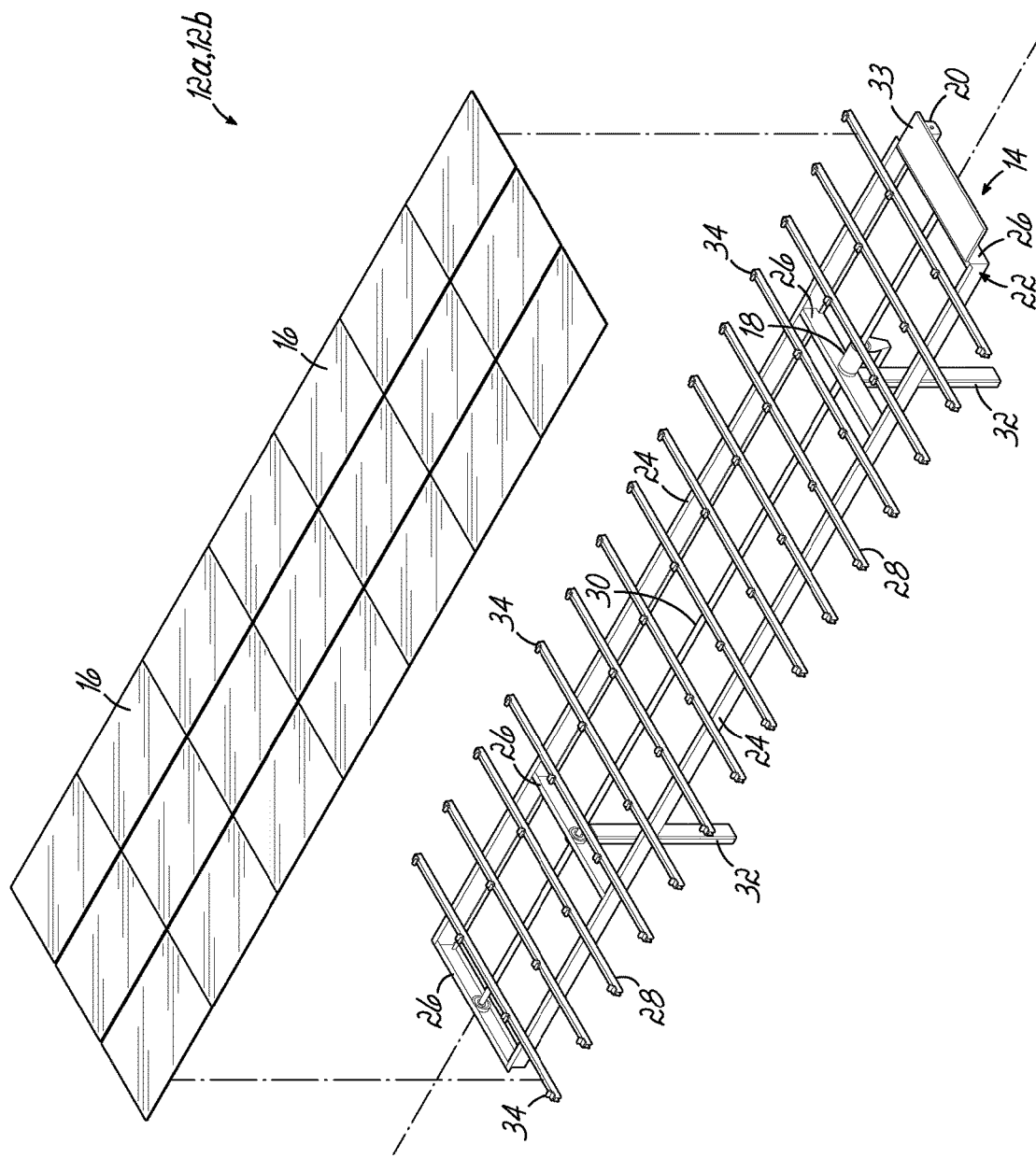
FIG. 1B is a disassembled top perspective view of the solar tracking system of FIG. 1A.

With reference to FIGS. 1A and 1B, a solar tracking system 10 in accordance with one embodiment includes first and second single axis trackers 12a, 12b arranged parallel to each other and each including at least one rotatable portion such as a rotatable table 14, each table 14 including a plurality of solar PV modules 16. Each table 14 is rotatable via a respective motor 18 and dedicated controller or tracker control unit ("TCU") 20. As set forth in further detail below, each TCU 20 is configured to take action to actively mitigate shading of the modules 16 in response to a determination that one or more modules 16 is presently shaded based on monitoring the electrical (e.g., current, voltage, and/or power) output of one or more of the modules 16. The features of the solar tracking system 10 are set forth in further detail below to clarify each of these functional advantages and other benefits provided in this disclosure.

In the embodiment shown, the table 14 of each tracker further includes a generally rectangular frame 22 for supporting the modules 16 mounted thereon. Each frame 22 includes a pair of longitudinally-extending support beams 24, a plurality of laterally-extending cross braces 26, and a plurality of laterally-extending mounting bars 28. Each table 14 also includes a driveshaft 30 affixed to the frame 22 and defining an axis of rotation about which the table 14 may rotate. In this regard, the driveshaft 30 for each table 14 is rotatably supported on bearings (not shown) mounted on respective pylons 32 which may be affixed to the ground, for example. The driveshafts 30 may each be oriented in a generally north-south direction so that rotation of the tables 14 about the respective axes may allow the modules 16 mounted thereon to track the east-west travel of the sun throughout the day. As described in greater detail below, rotation of the tables 14 may also assist in mitigating shading of the modules 16. In any event, each motor 18 is operatively coupled to the respective driveshaft 30 to provide torque thereto for rotating the respective table 14 in an automated manner. The motors 18 are in operative communication with the respective TCU 20 such that each motor 18 may be capable of receiving one or more signals from the respective TCU 20 to provide a predetermined amount of torque to the respective table 14 for adjusting the orientation of the modules 16 relative to horizontal as desired. Communication between the motors 18 and the respective TCU 20 may be performed via wires directly connecting the motors 18 to the TCU 20, or alternatively via a wireless network, for example. In one embodiment, electrical power may be supplied to each motor 18 by a respective PV pony panel 33 mounted on the respective table 14 and electrically isolated from the modules 16.

While the rotatable portions of the illustrated trackers 12a, 12b are shown as tables 14 including the modules 16, frames 22, and driveshafts 30, any other suitable configurations of the rotatable portions may be used. For example, the frames 22 may be eliminated and the modules 16 may be directly coupled to each other and to a central torque tube (not shown) so that the modules 16 may rotate together as a unit. In addition or alternatively, rotation of the rotatable portions including the modules 16 may be driven by one or more cables (not shown). Each driveshaft 30 may be rigid or flexible, depending on the particular application. It will be appreciated that the principles of the present invention may be applied to any other suitable solar tracker architectures having one or more rotatable portions including a plurality of modules 16.

As shown, the modules 16 of each tracker 12a, 12b are arranged in a landscape configuration in three parallel rows. However, the modules 16 may be arranged in any suitable configuration, such as a portrait (e.g., a one, or two-high portrait) configuration, and in any suitable number of rows, such as two or more than three. In any event, the modules 16 are mechanically coupled to each other and to the frame 22 via corresponding clips 34 or other suitable mounting hardware or attachment structures, such as nuts, bolts, and/or screws. As shown schematically in FIG. 2, the modules 16 of each row are electrically coupled to each other in a series configuration, such as via one or more conducting wires, to define first, second, and third discrete strings 40, 42, 44. Each string 40, 42, 44 of series-wired modules 16 is configured to supply power independent of the other strings 40, 42, 44. In other words, each string 40, 42, 44 of modules 16 may be electrically isolated from the remaining strings 40, 42, 44 on the respective tracker 12a, 12b.

Figure 2:
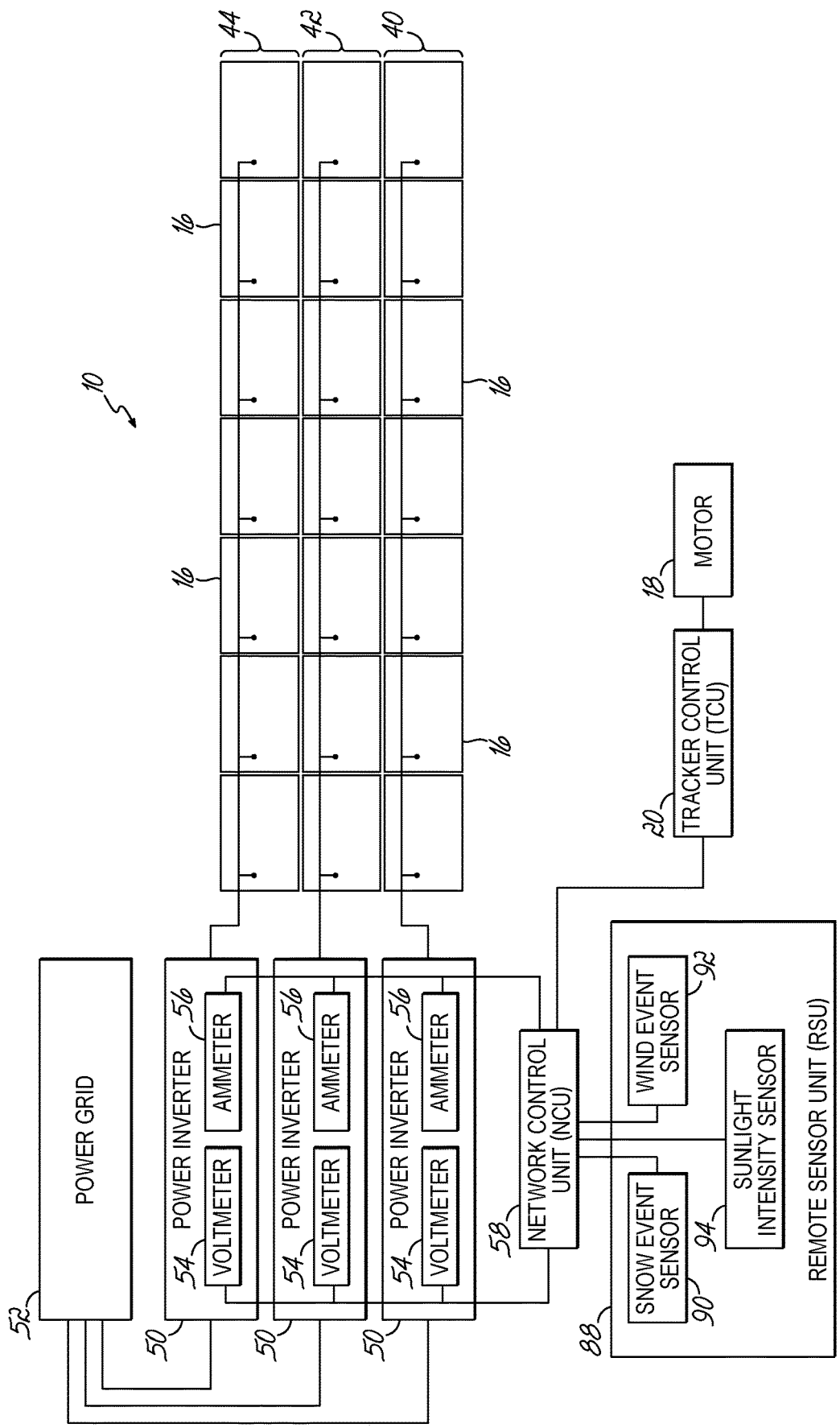
FIG. 2 is a top schematic view of the modules of one of the trackers of the solar tracking system of FIGS. 1A and 1B, showing three discrete strings of modules electrically coupled in series.
Figure 2A:
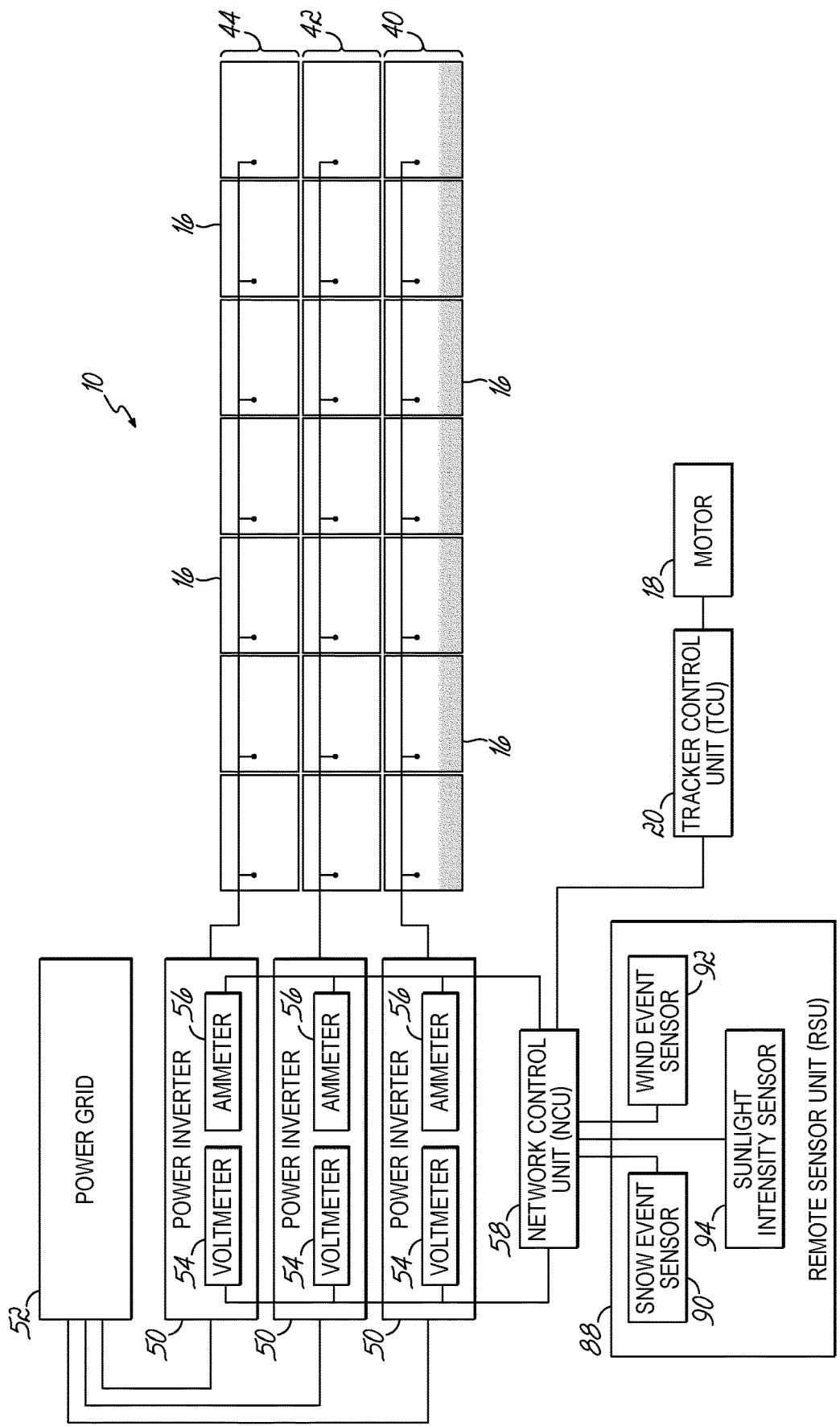
FIG. 2A is a top schematic view similar to FIG. 2, showing shading of the lower one-third of the lowermost string.
Figure 2B:
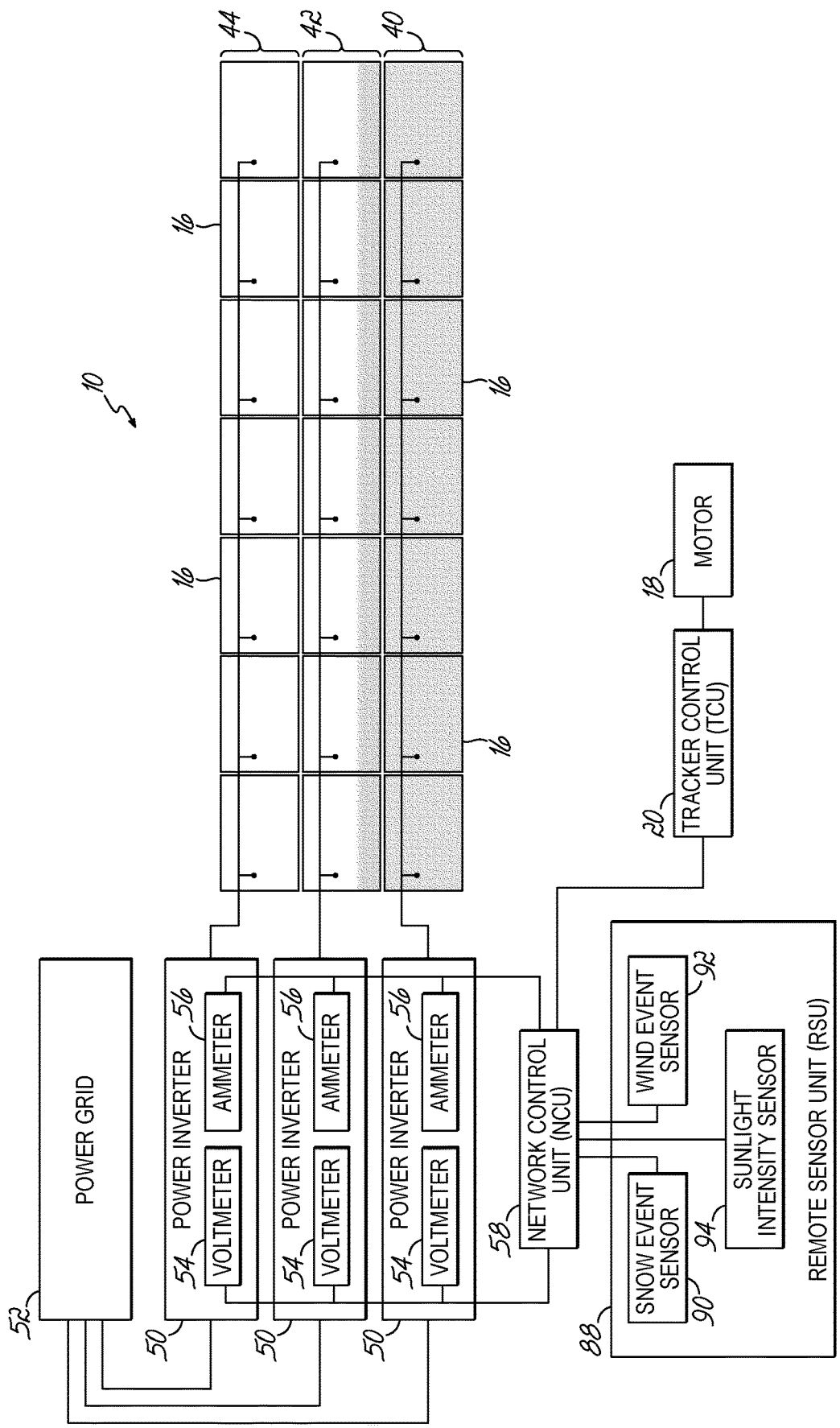
FIG. 2B is a top schematic view similar to FIG. 2, showing full shading of the lowermost string and shading of the lower one-third of the middle string.

With continuing reference to FIG. 2, each string 40, 42, 44 of modules 16 is electrically coupled to a corresponding solar power inverter 50 for changing the current provided by the respective string 40, 42, 44 from direct current (DC) to alternating current (AC) which may then be fed into a power grid 52. While a central inverter topology is shown and described, various aspects of this disclosure may be incorporated in a de-centralized (string inverter) topology, for example. In the embodiment shown, each inverter 50 includes a voltage sensor, such as a voltmeter 54, and a current sensor, such as an ammeter 56, for monitoring the voltage and current output, respectively, of the respective string 40, 42, 44 of modules 16. The voltmeter 54 and ammeter 56 are each in operative communication with a main controller or network control unit ("NCU") 58 such that the voltmeter 54 and ammeter 56 may each be capable of sending one or more signals to the NCU 58 containing information regarding the detected voltage and current output, respectively. Communication between the NCU 58 and the voltmeter 54 and/or ammeter 56 may be performed via wires directly connecting the voltmeter 54 and/or ammeter 56 to the NCU 58, or alternatively via a wireless network, for example. While the voltmeter 54 and ammeter 56 are illustrated as being incorporated into the power inverter 50, the voltmeter 54 and/or ammeter 56 may alternatively be configured independently of the power inverter 50. As shown in FIGS. 2A and 2B, the individual strings 40, 42, 44 of modules 16 may be subjected to partial or full shading by various obstructions such as cloud cover, snow accumulation, and/or the modules 16 of one or more neighboring trackers 12a, 12b, for example. Such shading may reduce the electrical output of the shaded string(s) 40, 42, 44, and this reduction in electrical output may be detected by the NCU 58 via the measurements received from the corresponding voltmeter 54 and/or ammeter 56, as described in greater detail below.

Figure 3:
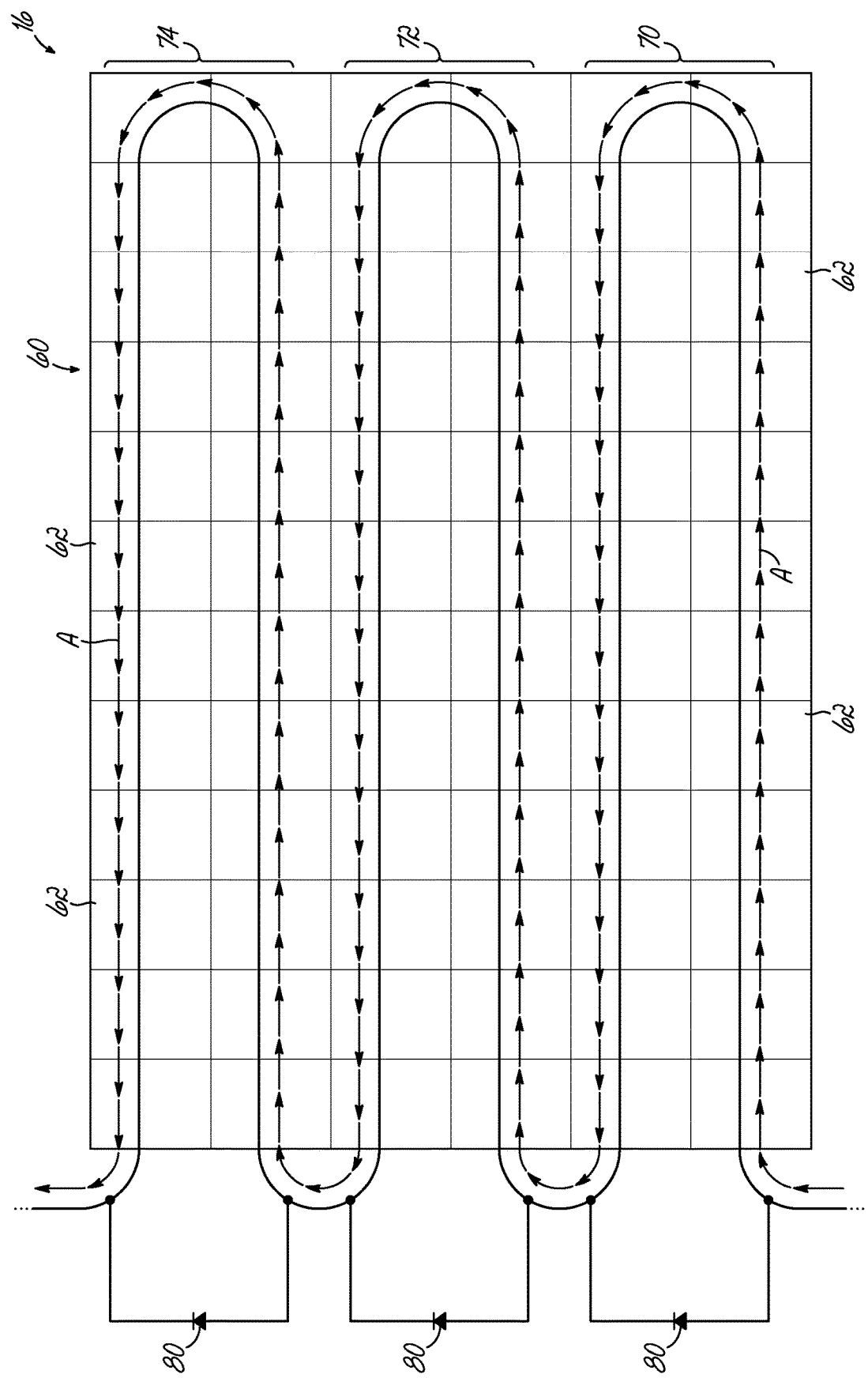
FIG. 3 is a magnified top schematic view of one of the modules of the tracker of FIG. 2, showing the electrical coupling between the solar cells of the module in three segments and showing current flowing through the solar cells of all three segments.

As best shown in FIG. 3, each exemplary module 16 includes a PV laminate 60 having a plurality of solar PV cells 62, which may be crystalline, evenly distributed in a plurality of rows. More particularly, each exemplary module 16 includes 72 cells 62 evenly distributed in six rows, such that each of the rows includes 12 cells 62. However, each module 16 may include any suitable number of cells 62 and/or rows of the cells 62. For example, each module 16 may include 60 cells 62 evenly distributed in six rows, such that each of the rows includes 10 cells 62. In any event, the cells 62 are electrically coupled to each other via conducting wires, for example, in a series configuration along a generally serpentine path so that current provided by the cells 62 may flow in the direction indicated by the arrows A. The path is divided into first, second, and third generally U-shaped segments 70, 72, 74 each including two rows of the cells 62. While the illustrated segments 70, 72, 74 are each generally U-shaped with rounded apexes, the segments 70, 72, 74 may be of any suitable shape. For example, the apexes of the segments 70, 72, 74 may be pointed (e.g., V-shaped) or squared.

Figure 3A:
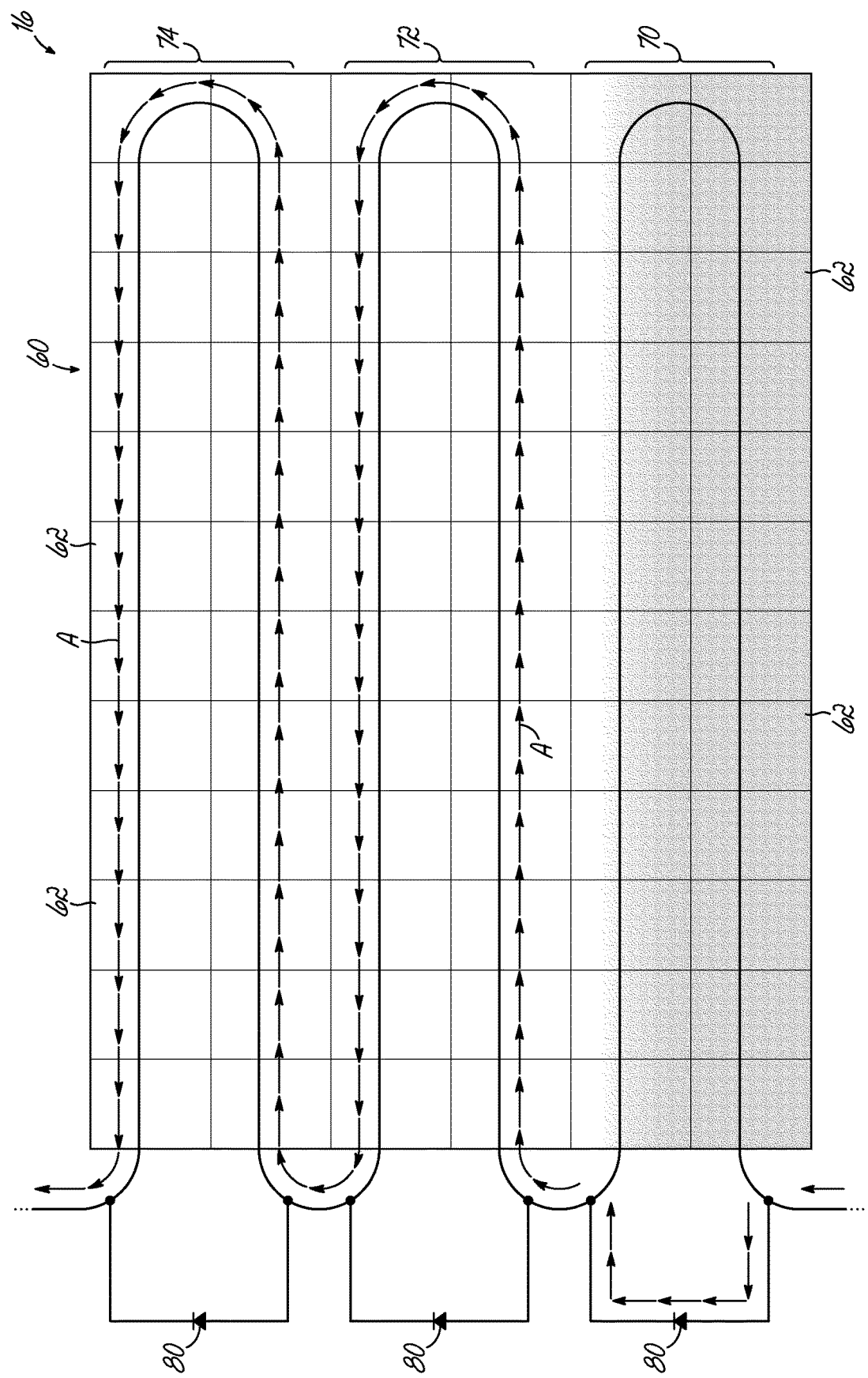
FIG. 3A is a magnified top schematic view similar to FIG. 3, showing shading of at least some of the cells of the first segment such that current bypasses the first segment.
Figure 3B:
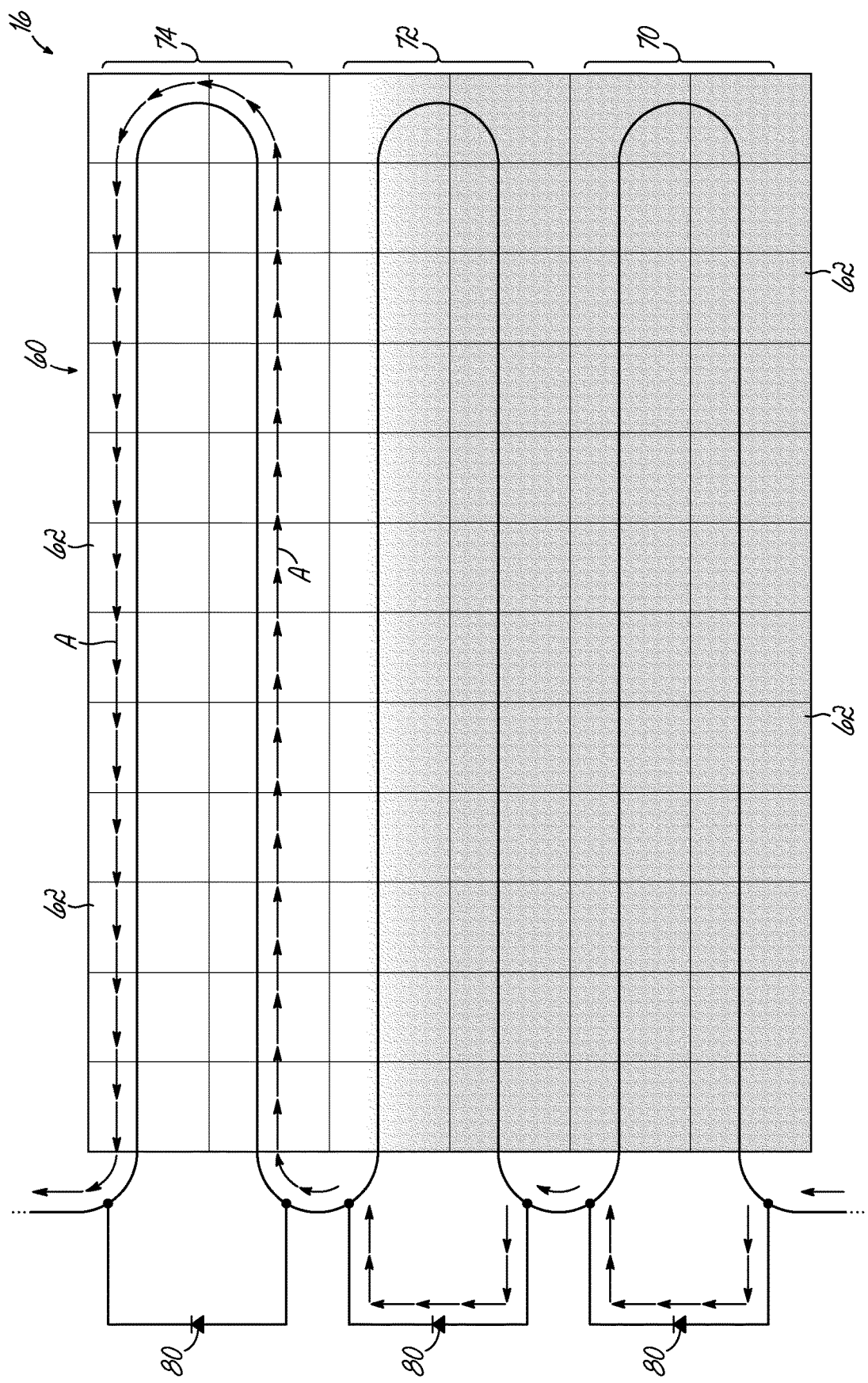
FIG. 3B is a magnified top schematic view similar to FIG. 3, showing shading of at least some of the cells of the first and second segments such that current bypasses the first and second segments.
Figure 3C:
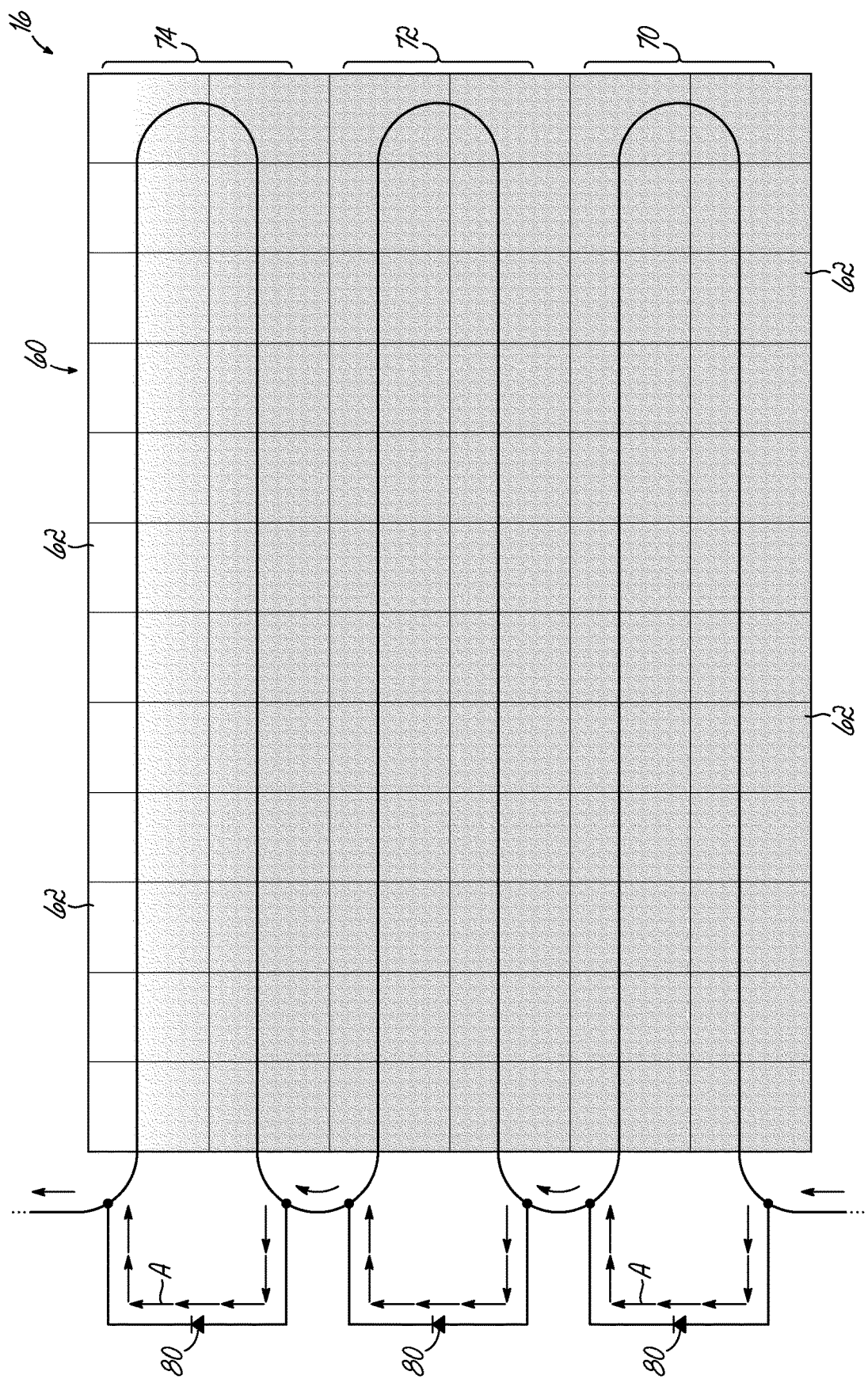
FIG. 3C is a magnified top schematic view similar to FIG. 3, showing shading of at least some of the cells of the first, second, and third segments such that current bypasses the first, second, and third segments.

Bypass diodes 80 are provided around (e.g., electrically coupled in a parallel configuration with) each segment 70, 72, 74 to prevent damage to the module 16 which may otherwise result from allowing current to flow through a segment 70, 72, 74 that has been subjected to a high resistance, such as by shading of one or more cells 62 of the segment 70, 72, 74 as shown in FIGS. 3A-3C. In this regard, when one or more of the cells 62 in one of the segments 70, 72, 74 is shaded by an obstruction such as cloud cover, snow accumulation, or another module 16, the respective bypass diode 80 may be activated by the resulting resistance in the segment 70, 72, 74 to thereby allow the current to bypass that segment 70, 72, 74 and proceed directly to a subsequent or downstream segment 70, 72, 74 or module 16. As a consequence, the cells 62 in the bypassed segment(s) 70, 72, 74 may not provide any current, such that the electrical output of the module 16 may be reduced proportionately with respect to the total number of segments 70, 72, 74 in the module. For example, shading of one or more cells 62 in the first segment 70 of the three illustrated segments 70, 72, 74 may result in a one-third reduction in electrical output of the module 16 (FIG. 3A), shading of one or more cells 62 in the first and second segments 70, 72 may result in a two-thirds reduction in electrical output of the module 16 (FIG. 3B), and shading of one or more cells 62 in all three segments 70, 72, 74 may result in a substantial elimination of electrical output of the module 16 (FIG. 3C). The electrical output of the respective string 40, 42, 44 of modules 16 and of the respective tracker 12a, 12b may reduce accordingly. For example, shading of one or more cells 62 in all three segments 70, 72, 74 of all of the modules 16 of the first string 40 may result in a substantial elimination of electrical output of the first string 40 and thus a one-third reduction in electrical output of the respective tracker 12a, 12b.

While the exemplary module 16 is shown and described as being populated with a plurality of full cells 62, it will be appreciated that other types or sizes of cells may be used. For example, the illustrated 72 full cells 62 may be replaced with 144 half cells (not shown) arranged into independent upper and lower module halves, the half cells in each module half being electrically coupled to each other in a series configuration along a generally serpentine path similar to that shown for the entire module 16 in FIG. 3 and similarly divided into first, second, and third generally U-shaped segments each including two rows of the cell halves. Such a configuration may provide an improved shading response over that of the illustrated exemplary modules 16. For example, such a configuration may result in a lower electrical output loss when a single half cell is shaded than when a single full cell 62 is shaded, since a single shaded half cell may only eliminate a sixth of the total electrical output of the respective module while a single shaded full cell 62 can eliminate a third of the total electrical output of the illustrated module 16.

In one embodiment, the NCU 58 is configured to calculate the power output of each string 40, 42, 44 of modules 16 based on the voltage and current output detected by the respective voltmeter 54 and ammeter 56, and to compare the power output of each string 40, 42, 44 of modules 16 to the power output of the remaining strings 40, 42, 44 of modules 16 on the respective tracker 12a, 12b. Alternatively, the NCU 58 may simply compare the voltage and/or current output of each string 40, 42, 44 of modules 16 to the voltage and/or current output of the remaining strings 40, 42, 44 without calculating the power outputs.

Based on such a comparison (of power outputs, or of voltages and/or current outputs), the NCU 58 may determine whether one of the strings 40, 42, 44 of modules 16, such as the first string 40, is being partially or fully shaded.

For example, if the power outputs of each string 40, 42, 44 of the first tracker 12a are equal, then the NCU 58 may determine that all of the strings 40, 42, 44 of the first tracker 12a are presently exposed to maximum available sunlight (FIG. 2). However, if the power output of the first string 40 is less than the power outputs of the second and third strings 42, 44, then the NCU 58 may determine that the first string 40 is at least partially shaded. For example, if the power output of the first string 40 is less than the power output of each of the second and third strings 42, 44 by one-third, then the NCU 58 may determine that one or more cells 62 in one of the segments 70, 72, 74, such as the first segment 70, of one or more modules 16 in the first string 40 are shaded (FIG. 2A). In this case, the NCU 58 may pinpoint the first segment 70 in particular since shading is typically contiguous and since the second string 42 is not shaded, and thus the shading is more likely to be located on the portion of the first string 40 opposite the second string 42 (e.g., the first segment 70) than on the portion(s) of the first string 40 closer to the second string 42.

If the power output of the first string 40 is substantially eliminated and the power output of the second string 42 is less than the power output of the third string 44 by one-third, then the NCU 58 may determine that the first string 40 is fully shaded and that one or more cells 62 in the one of the segments 70, 72, 74, such as the first segment 70, of one or more modules 16 in the second string 42 are shaded (FIG. 2B). In this case, the NCU 58 may pinpoint the first segment 70 in particular since the first string 40 is shaded and the third string 44 is not shaded, and thus the shading is more likely to be located on the portion of the second string 42 opposite the third string 44 and closer to the first string 40. Thus, the NCU 58 may accurately determine which particular strings 40, 42, 44 and portions thereof are subject to shading based on the actual outputs of the individual strings 40, 42, 44.

In one embodiment, the NCU 58 is configured to instruct each motor 18 via the respective TCU 20 to rotate the respective table 14 to a particular orientation relative to horizontal in response to the one or more signals received from the voltmeter 54 and/or ammeter 56 in order to expose the respective modules 16 to a desired amount of sunlight for achieving a desired power output from the modules 16. For example, the NCU 58 may instruct one or more of the motors 18 via the respective TCU 20 to rotate the respective table 14 based on the comparison of power outputs (or of voltages and current outputs). Thus, the solar tracking system 10 may utilize active backtracking to determine a desired orientation of the modules 16. More particularly, the solar tracking system 10 may base the desired orientation on algorithms which directly rely on the actual outputs of the modules 16 rather than on passive setpoints. In this manner, the solar tracking system 10 may provide a more holistic approach than conventional solar tracking systems by taking into account various real-time factors which may impact the amount of sunlight actually received by the modules 16, including shading which may be caused by obstructions such as cloud cover, snow accumulation, and/or other modules 16, for example.

Referring again to FIG. 2, the illustrated solar tracking system 10 also includes a meteorological station or remote sensor unit ("RSU") 88 including a snow event sensor 90 configured to collect information indicating whether snow accumulation may be present on the modules 16 of the trackers 12a, 12b. The snow event sensor 90 may include, for example, an infrared (IR) sensor configured to detect a distance from the snow event sensor to the ground or to the top of snow accumulation on the ground, such that the detected distance may indicate whether snow accumulation is present. In addition or alternatively, the snow event sensor 90 may include a temperature sensor configured to detect an atmospheric temperature near the modules 16, such as an atmospheric temperature at or below the freezing point of water, for example. In any case, the snow event sensor 90 is in operative communication with the NCU 58 such that the snow event sensor 90 may be capable of sending one or more signals to the NCU 58 containing information indicating whether snow accumulation may be present on the modules 16. Communication between the snow event sensor 90 and the NCU 58 may be performed via wires directly connecting the snow event sensor 90 to the NCU 58, or alternatively via a wireless network, for example.

The NCU 58 may be configured to instruct each motor 18 via the respective TCU 20 to rotate the respective table 14 to a maximum tilt relative to horizontal or other suitable snow shedding position in response to the one or more signals received from the snow event sensor 90 in order to shed snow accumulation from the modules 16. The NCU 58 may subsequently monitor one or more signals received from the voltmeter 54 and/or ammeter 56 in order to determine whether the modules 16 of each string 40, 42, 44 are providing a desired threshold power output indicating that the snow accumulation has been sufficiently shed, and instruct each motor 18 via the respective TCU 20 to rotate the respective table 14 to a normal operating position in response to such a determination. Thus, the solar tracking system 10 may utilize active snow shedding to maintain the tables 14 at the maximum tilt for substantially no more or less than the appropriate duration to achieve sufficient snow shedding. More particularly, the solar tracking system 10 may base the duration of the tables 14 maintained at the maximum tilt on algorithms which directly rely on the actual outputs of the modules 16 rather than on an arbitrary pre-set duration. In this manner, the solar tracking system 10 may provide a more efficient approach to snow shedding than conventional solar tracking systems.

The RSU 88 of the illustrated solar tracking system 10 also includes a wind event sensor 92 configured to collect information indicating whether potentially hazardous winds are present near the modules 16. The wind event sensor 92 may include, for example, an anemometer configured to detect a wind speed above a predetermined threshold speed which may qualify as a wind event. The wind event sensor 92 is in operative communication with the NCU 58 such that the wind event sensor 92 may be capable of sending one or more signals to the NCU 58 containing information indicating whether potentially hazardous winds are present near the modules 16. Communication between the wind event sensor 92 and the NCU 58 may be performed via wires directly connecting the wind event sensor 92 to the NCU 58, or alternatively via a wireless network, for example.

The NCU 58 may be configured to instruct each motor 18 via the respective TCU 20 to rotate the respective table 14 to a safe stowed position, such as a horizontal or flat position, in response to the one or more signals received from the wind event sensor 92 in order to protect the modules 16 from possible damage due to potentially hazardous wind conditions.

The RSU 88 of the illustrated solar tracking system 10 also includes a sunlight intensity sensor 94 configured to measure the intensity of sunlight near the modules 16. The sunlight intensity sensor 94 may include, for example, an irradiance sensor which provides an output of current measurement indicative of the intensity of sunlight. The sunlight intensity sensor 94 is in operative communication with the NCU 58 such that the sunlight intensity sensor 94 may be capable of sending one or more signals to the NCU 58 containing information indicating the intensity of sunlight present near the modules 16. Communication between the sunlight intensity sensor 94 and the NCU 58 may be performed via wires directly connecting the sunlight intensity sensor 94 to the NCU 58, or alternatively via a wireless network, for example.

While the NCU 58 is described above as instructing one or more of the motors 18 via the respective TCU 20 to rotate the respective table 14 based on a comparison of power outputs (or of voltages and current outputs) from the individual strings 40, 42, 44, in another embodiment, the NCU 58 may compare an output of each string 40, 42, 44, such as a current output, to an expected output based on the present sunlight intensity as detected by the sunlight intensity sensor 94 of the RSU 88. Based on such a comparison, the NCU 58 may determine whether one of the strings 40, 42, 44 of modules 16 is being partially or fully shaded. Thus, rather than comparing the outputs of the strings 40, 42, 44 to each other, the NCU 58 may separately compare each actual output to the expected output. Similar to the above, in this alternative manner, the solar tracking system 10 may base the desired orientations of the tables 14 on algorithms which directly rely on the actual outputs of the modules 16 rather than on passive setpoints. Since this alternative approach does not involve comparisons between multiple strings 40, 42, 44 of modules 16, this alternative approach may be particularly suitable for applications wherein each tracker 12a, 12b includes only a single string 40, 42, 44 of modules 16 which may each be populated with half cells, for example.

Figure 6:
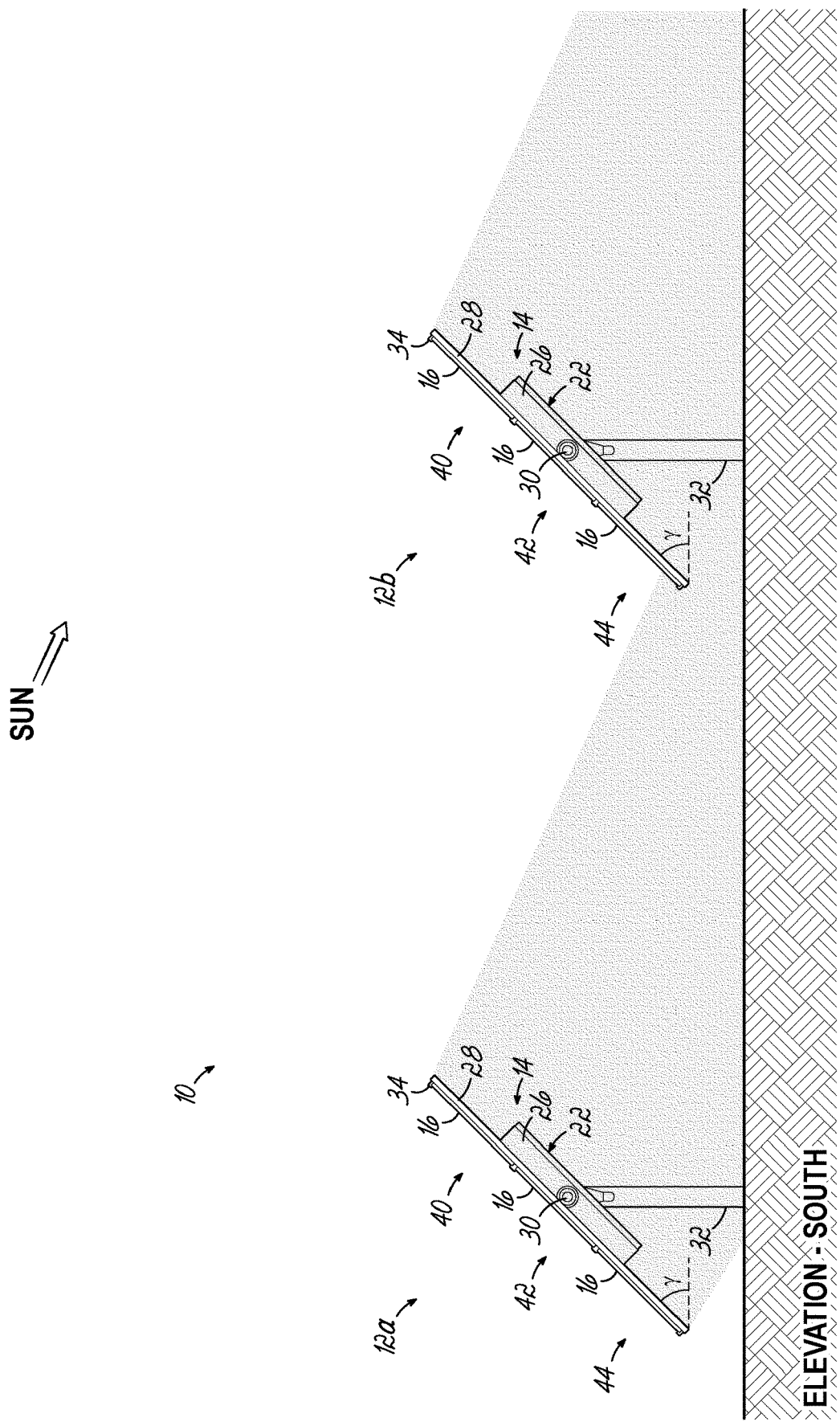
FIG. 6 is a side elevation view of the solar tracking system of FIGS. 1A and 1B, showing the tables of both trackers tilted to face the evening sun, with the modules of the westernmost table casting shade onto the lower modules of the easternmost table.

Referring now to FIGS. 4-6, the orientations of the tables 14 of each of the trackers 12a, 12b may be adjusted throughout the day to track the east-west travel of the sun. For example, the tables 14 may be tilted such that the modules 16 thereon are at least partially facing east in the morning (FIG. 4), flattened such that the modules 16 thereon are facing directly upward at noon (FIG. 5), and tilted such that the modules 16 thereon are at least partially facing west in the evening (FIG. 6).

As shown in FIG. 4, during the morning the tables 14 of each of the trackers 12a, 12b may be initially tilted to a desired orientation relative to horizontal to minimize the angle of incidence between the incoming sunlight and each module 16 of the trackers 12a, 12b. For example, each of the tables 14 may be tilted at an angle $\alpha$ of between approximately 45° and approximately 60° relative to horizontal. In one embodiment, the desired orientation may be a theoretical optimum orientation determined by the NCU 58 based on passive setpoints, such as Global Positioning System (GPS) data, time, and date, for example. When tilted to the desired orientation as shown, the modules 16 of the easternmost (second) tracker 12b are fully exposed to direct sunlight. Thus, the modules 16 of the easternmost tracker 12b may provide an optimum power output. However, the modules 16 of the easternmost tracker 12b cast shade onto at least some of the modules 16 of the westernmost (first) tracker 12a, such as the first string 40 of modules 16 thereof. As a result, the first string 40 of the westernmost tracker 12a may provide a significantly reduced power output. In some cases, the benefit of the easternmost tracker 12b providing optimum power output may be outweighed by the loss of the westernmost tracker 12a providing reduced power output. Moreover, the easternmost tracker 12b may be capable of providing near-optimum power output when the respective table 14 is tilted slightly away from the theoretical optimum orientation.

Figure 4A:
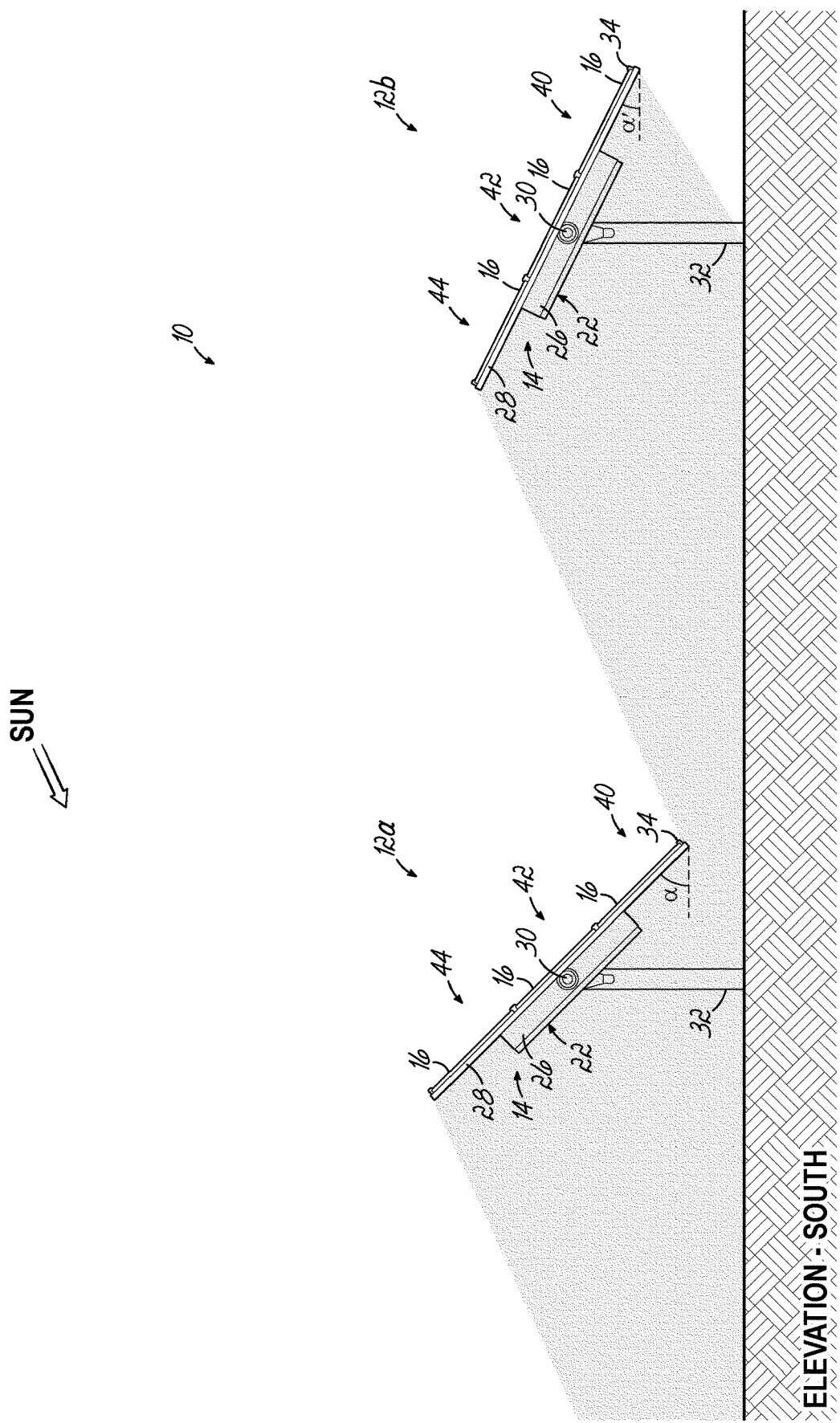
FIG. 4A is a side elevation view similar to FIG. 4, showing the easternmost table slightly flattened to eliminate the shading.

In response to receiving a signal from the voltmeter 54 and/or ammeter 56 of the first string 40 of the westernmost tracker 12a indicating that the power output of the first string 40 is substantially less than the power output of the remaining strings 42, 44 of the westernmost tracker 12a, the NCU 58 may infer that the tilted easternmost tracker 12b is casting shade onto the first string 40 of the westernmost tracker 12a and may send a signal to the motor 18 of the easternmost tracker 12b to rotate the respective table 14 to a slightly flatter or reduced orientation relative to horizontal to mitigate the shading cast onto the first string 40 of the westernmost tracker 12a by the modules 16 of the easternmost tracker 12b, as shown in FIG. 4A. For example, the orientation of the table 14 of the easternmost tracker 12b may be reduced by between approximately 2° and approximately 5° such that the table 14 of the easternmost tracker 12b may be tilted at an adjusted angle $\alpha'$ of between approximately 40° and approximately 55° relative to horizontal. When tilted to the reduced orientation, the modules 16 of the easternmost tracker 12b may be fully exposed to direct and/or indirect sunlight. Thus, the modules 16 of the easternmost tracker 12b may continue to provide an optimum or near-optimum power output. Moreover, the modules 16 of the westernmost tracker 12a including the first string 40 thereof may also be fully exposed to direct sunlight such that the modules 16 of the westernmost tracker 12a may also provide an optimum power output. In one embodiment, the NCU 58 may pinpoint the particular segment(s) 70, 72, 74 of the modules 16 of the first string 40 of the westernmost tracker 12a being shaded in the manner described above and may select the reduced orientation for the easternmost tracker 12b based on this determination.

As shown in FIG. 5, at noon the tables 14 of each of the trackers 12a, 12b may be initially tilted to a desired orientation relative to horizontal to minimize the angle of incidence between the incoming sunlight and each module 16 of the trackers 12a, 12b. For example, each of the tables 14 may be flattened, or tilted at an angle $\beta$ of approximately 0° relative to horizontal. In one embodiment, the desired orientation may be a theoretical optimum orientation determined by the NCU 58 based on passive setpoints, such as GPS data, time, and date, for example. When tilted to the desired orientation as shown, the modules 16 of the easternmost tracker 12b are fully exposed to direct sunlight. Thus, the modules 16 of the easternmost tracker 12b may provide an optimum power output. However, cloud cover may cast shade onto at least some of the modules 16 of the westernmost tracker 12a, such as the first string 40 of modules 16 thereof. As a result, the first string 40 of the westernmost tracker 12a may provide a significantly reduced power output. In some cases, the benefit of the table 14 of the westernmost tracker 12a being tilted to the theoretical optimum orientation may be outweighed by the loss in power output from the westernmost tracker 12a caused by the cloud cover. Moreover, the westernmost tracker 12a may be capable of providing near-optimum power output when the respective table 14 is tilted slightly away from the theoretical optimum orientation.

In response to receiving a signal from the voltmeter 54 and/or ammeter 56 of the first string 40 of the westernmost tracker 12a indicating that the power output of the first string 40 is substantially less than the power output of the remaining strings 42, 44 of the westernmost tracker 12a, the NCU 58 may infer that cloud cover is casting shade onto the first string 40 of the westernmost tracker 12a and may send a signal to the motor 18 of the westernmost tracker 12a to rotate the respective table 14 to be slightly tilted relative to horizontal to mitigate the shading cast onto the first string 40 of the westernmost tracker 12a by the cloud cover, as shown in FIG. 5A. For example, the table 14 of the westernmost tracker 12a may be tilted at an adjusted angle β' of between approximately 45° and approximately 60° relative to horizontal. When tilted to the desired orientation, the modules 16 of the westernmost tracker 12a may avoid the cloud cover and instead may be fully exposed to direct and/or indirect sunlight. Thus, the modules 16 of the westernmost tracker 12a including the first string 40 thereof may provide an optimum or near-optimum power output. In one embodiment, the NCU 58 may pinpoint the particular segment(s) 70, 72, 74 of the first string 40 of the westernmost tracker 12a being shaded in the manner described above and may select the orientation for the westernmost tracker 12a based on this determination. It will be appreciated that the orientation of the tables 14 shown in FIG. 5 may also be used as a safe stowed position, such as during potentially hazardous wind conditions.

As shown in FIG. 6, during the evening the tables 14 of each of the trackers 12a, 12b may be initially tilted to a desired orientation relative to horizontal to minimize the angle of incidence between the incoming sunlight and each module 16 of the trackers 12a, 12b. For example, each of the tables 14 may be tilted at an angle γ of between approximately 45° and approximately 60° relative to horizontal. In one embodiment, the desired orientation may be a theoretical optimum orientation determined by the NCU 58 based on passive setpoints, such as GPS data, time, and date, for example. When tilted to the desired orientation as shown, the modules 16 of the westernmost tracker 12a are fully exposed to direct sunlight. Thus, the modules 16 of the westernmost tracker 12a may provide an optimum power output. However, the modules 16 of the westernmost tracker 12a cast shade onto at least some of the modules 16 of the easternmost tracker 12b, such as the third string 44 of modules 16 thereof. As a result, the third string 44 of the easternmost tracker 12b may provide a significantly reduced power output. In some cases, the benefit of the westernmost tracker 12a providing optimum power output may be outweighed by the loss of the easternmost tracker 12b providing reduced power output. Moreover, the westernmost tracker 12a may be capable of providing near-optimum power output when the respective table 14 is tilted slightly away from the theoretical optimum orientation.

Figure 6A:
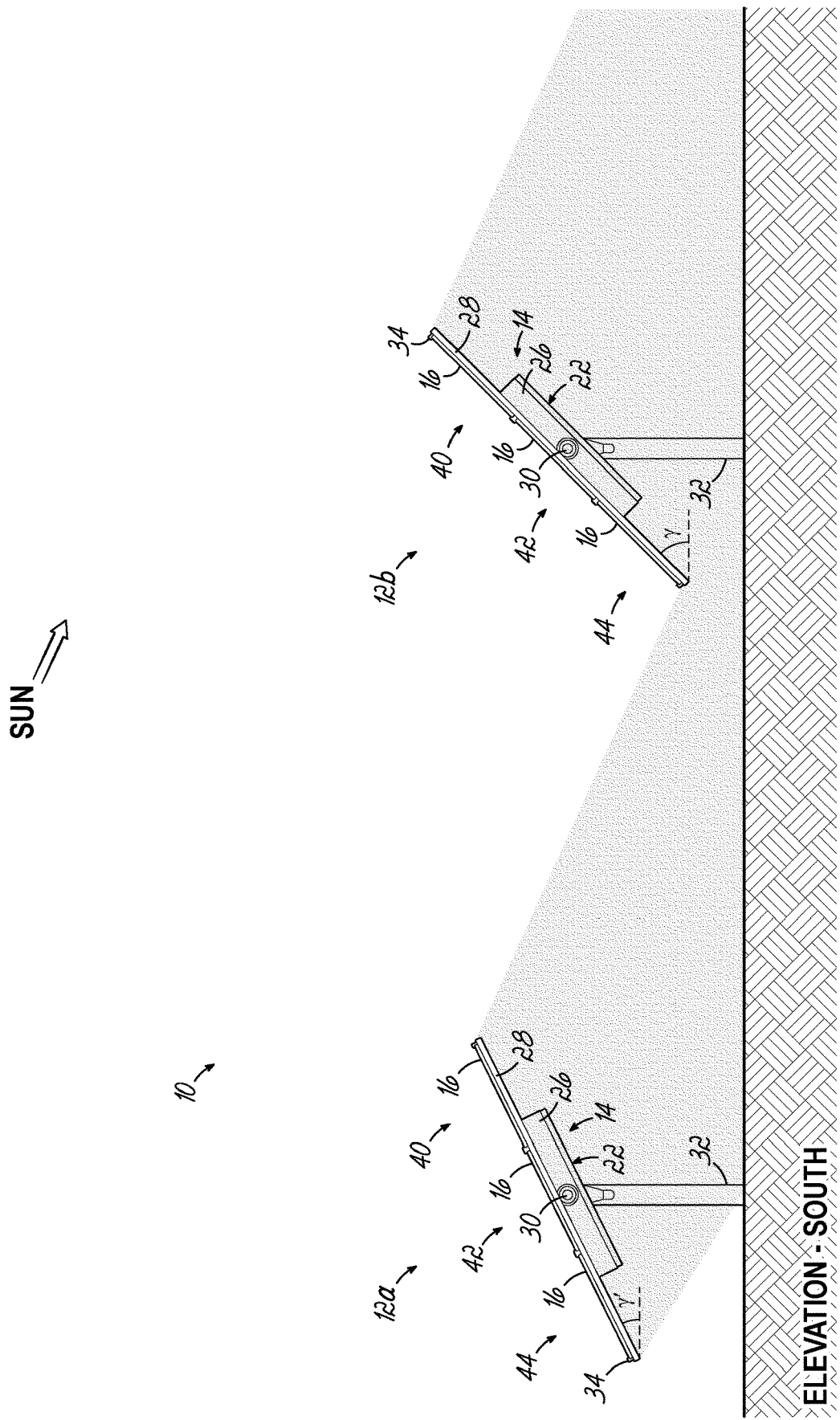
FIG. 6A is a side elevation view similar to FIG. 6, showing the westernmost table slightly flattened to eliminate the shading.

In response to receiving a signal from the voltmeter 54 and/or ammeter 56 of the third string 44 of the easternmost tracker 12b indicating that the power output of the third string 44 of the easternmost tracker 12b is substantially less than the power output of the remaining strings 40, 42 of the easternmost tracker 12b, the NCU 58 may infer that the tilted westernmost tracker 12a is casting shade onto the third string 44 of the easternmost tracker 12b and may send a signal to the motor 18 of the westernmost tracker 12a to rotate the respective table 14 to a slightly flatter or reduced orientation relative to horizontal to mitigate the shading cast onto the third string 44 of the easternmost tracker 12b by the modules 16 of the westernmost tracker 12a, as shown in FIG. 6A. For example, the orientation of the table 14 of the westernmost tracker 12a may be reduced by between approximately 2° and approximately 5° such that the table 14 of the westernmost tracker 12a may be tilted at an adjusted angle γ' of between approximately 40° and approximately 55° relative to horizontal. When tilted to the reduced orientation, the modules 16 of the westernmost tracker 12a may be fully exposed to direct and/or indirect sunlight. Thus, the modules 16 of the westernmost tracker 12a may continue to provide an optimum or near-optimum power output. Moreover, the modules 16 of the easternmost tracker 12b including the third string 44 thereof may also be fully exposed to direct sunlight such that the modules 16 of the easternmost tracker 12b may also provide an optimum power output. In one embodiment, the NCU 58 may pinpoint the particular segment(s) 70, 72, 74 of the third string 44 of the easternmost tracker 12b being shaded in the manner described above and may select the reduced orientation for the westernmost tracker 12a based on this determination.

Figure 7:
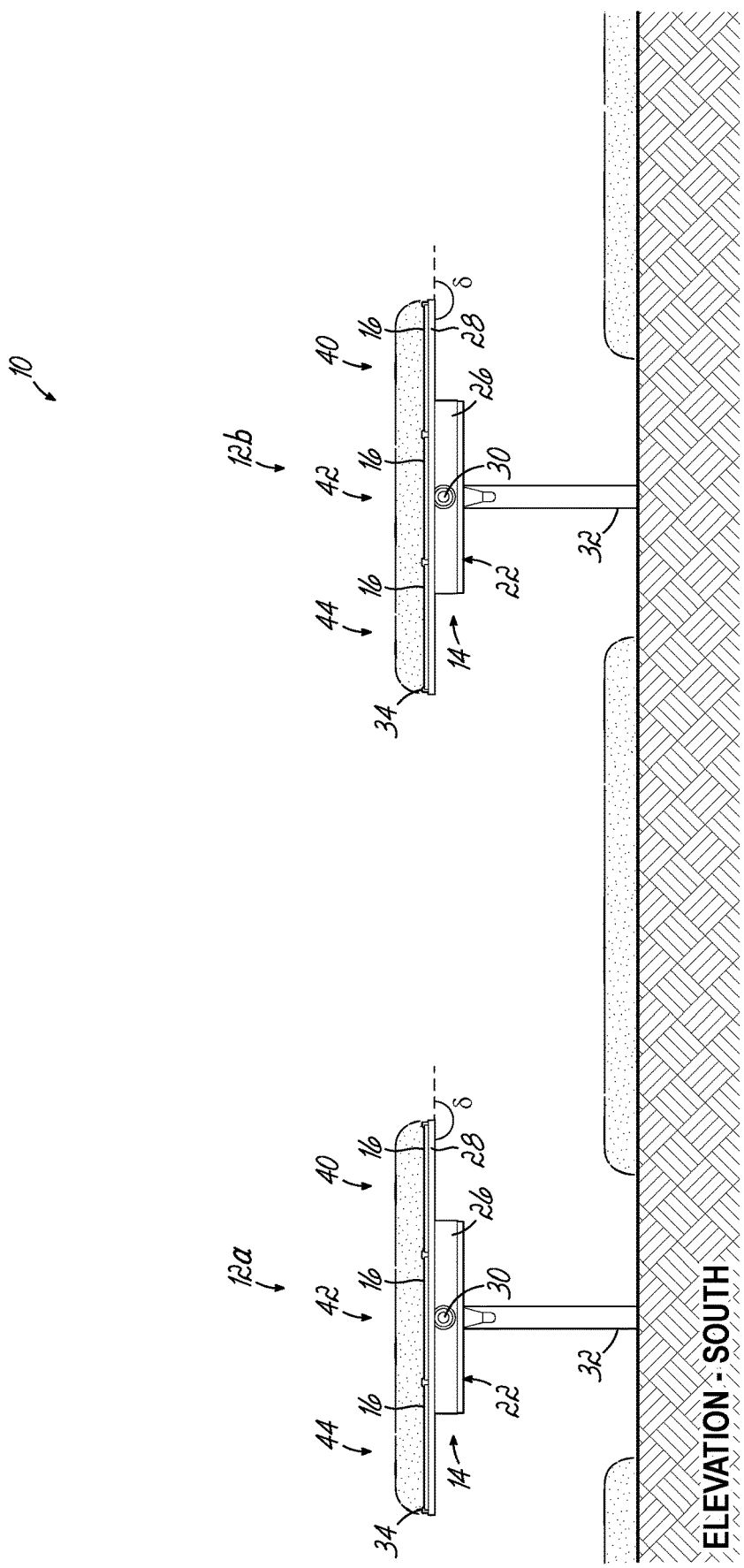
FIG. 7 is a side elevation view of the solar tracking system of FIGS. 1A and 1B, showing snow accumulation on the tables of both trackers.

Referring now to FIG. 7, snow accumulation may be present on one or more of the trackers 12a, 12b during normal operation while the tables 14 are tilted to a desired orientation relative to horizontal to minimize the angle of incidence between the incoming sunlight and each module 16 of the trackers 12a, 12b. For example, each of the tables 14 may be flattened, or tilted at an angle δ of approximately 0° relative to horizontal at noon. Such snow accumulation may substantially cover at least some of the modules 16 of the trackers 12a, 12b and block the covered modules 16 from receiving sunlight. As a result, the modules 16 of the trackers 12a, 12b may provide a significantly reduced power output.

Figure 7A:
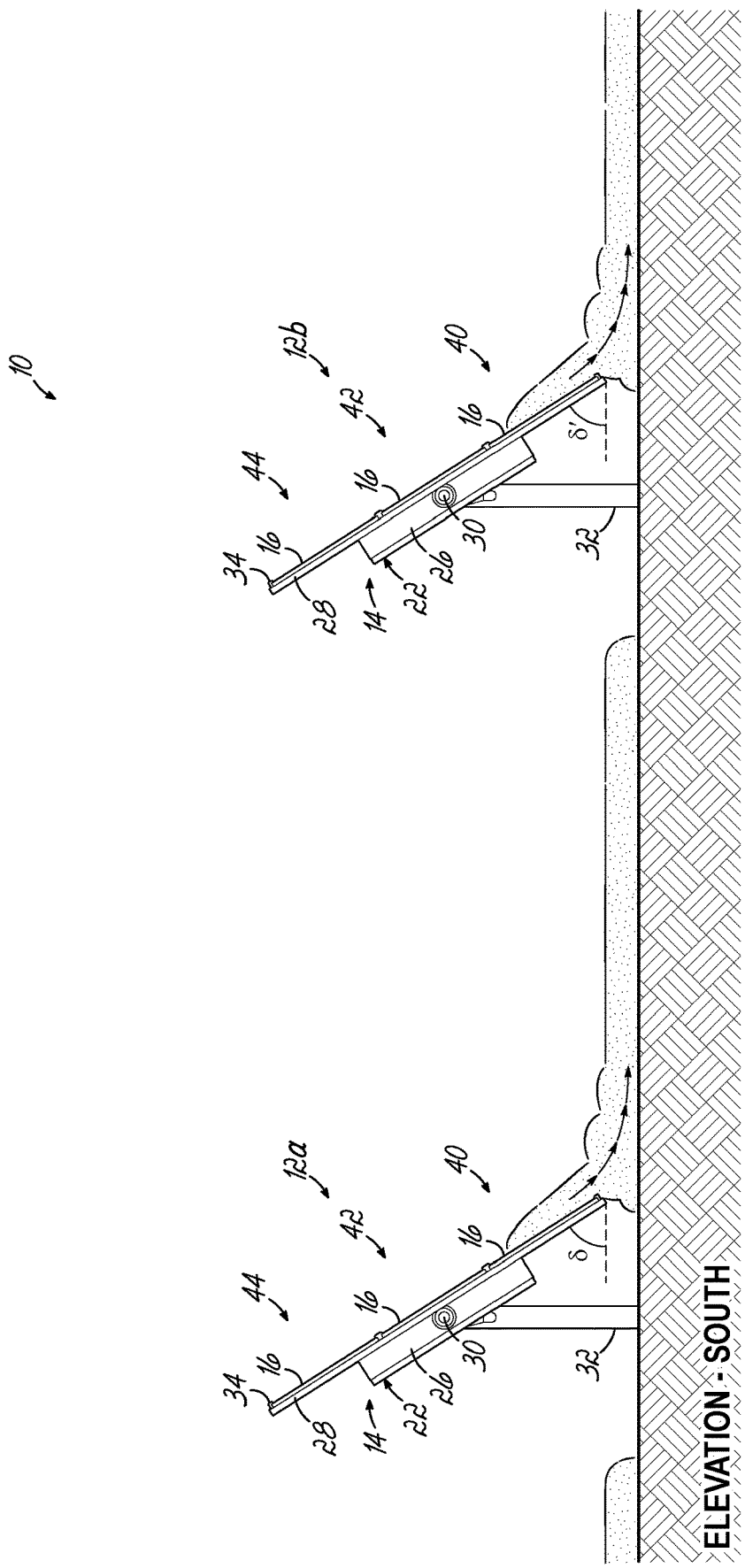
FIG. 7A is a side elevation view similar to FIG. 7, showing the tables of both trackers tilted to a maximum tilt angle to shed the snow accumulation from the tables.

In response to receiving a signal from the snow event sensor 90 indicating that snow accumulation is present on the ground, the NCU 58 may infer that snow accumulation is also present on one or more modules 16 and may send a signal to the motors 18 of the trackers 12a, 12b to rotate the respective tables 14 to a maximum orientation relative to horizontal to shed the snow accumulation from the modules 16 onto the ground, as shown in FIG. 7A. For example, the tables 14 may be tilted at an adjusted angle δ' of between approximately 45° and approximately 60° relative to horizontal. The NCU 58 may continue to monitor the voltage and current output of each string 40, 42, 44 of modules 16 of each tracker 12a, 12b while the tables 14 are at the maximum orientation relative to horizontal. In response to receiving one or more signals from the respective voltmeters 54 and/or ammeters 56 indicating that the voltage and/or current outputs of each of the strings 40, 42, 44 are within an acceptable predetermined range (or have substantially increased relative to the outputs prior to tilting to the maximum orientation), the NCU 58 may infer that the snow accumulation has been sufficiently shed from the modules 16 and may send a signal to the motors 18 of the trackers 12a, 12b to rotate the respective tables 14 to a desired orientation relative to horizontal to minimize the angle of incidence between the incoming sunlight and each module 16 of the trackers 12a, 12b. For example, the tables 14 may be returned to their initial orientations prior to tilting to the maximum orientation, such as the those shown in FIG. 7, and normal operation may be resumed.

In one embodiment, each tracker 12a, 12b may be configured to rotate to multiple snow shedding orientations. For example, each tracker 12a, 12b may be configured to rotate to a first snow shedding orientation wherein the modules 16 thereof face generally eastward during the morning and may be configured to rotate to a second snow shedding orientation wherein the modules 16 thereof face generally westward during the evening so that the modules 16 may receive sunlight as the snow accumulation is shed.

Figure 8:
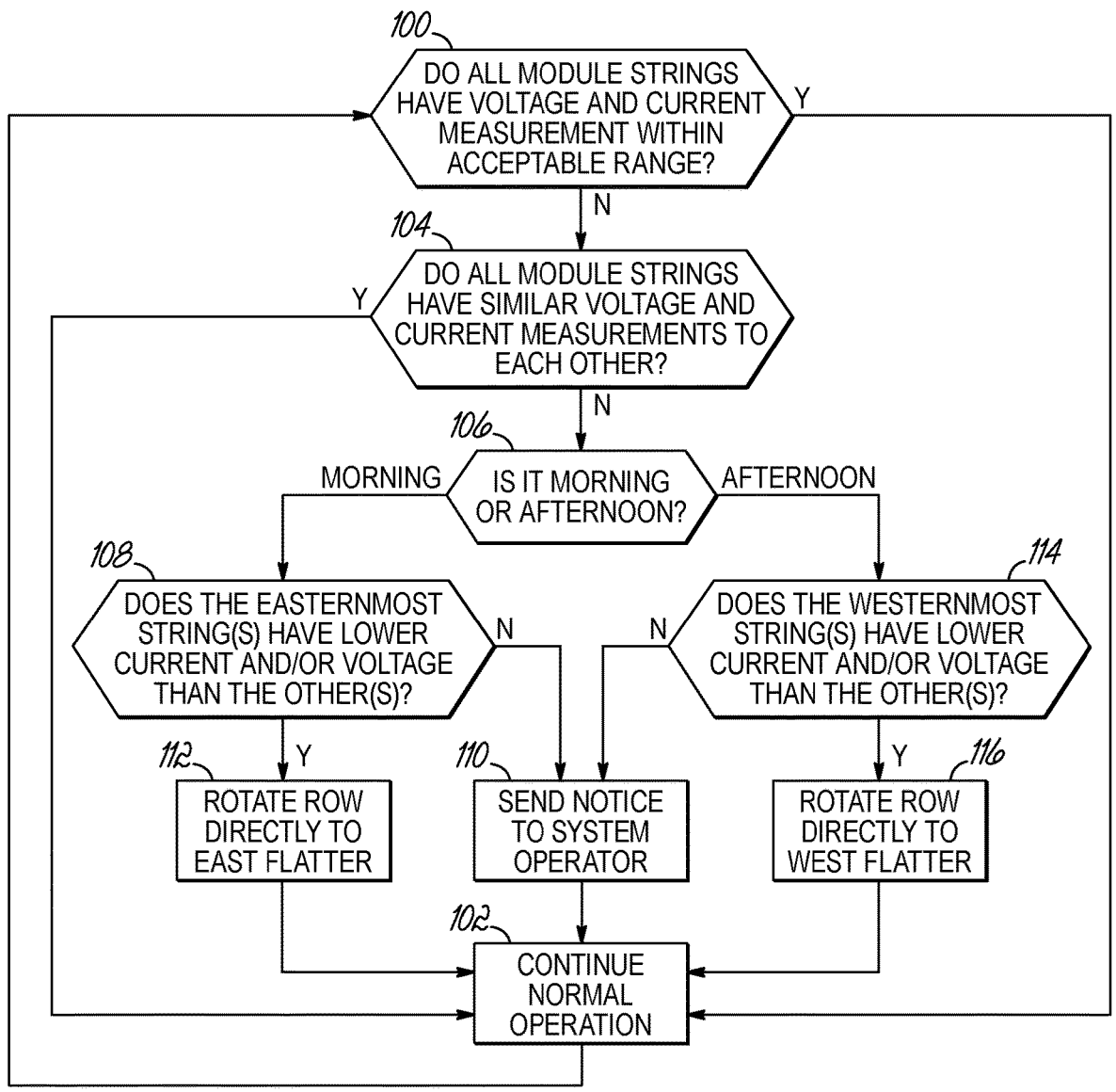
FIG. 8 is a flow diagram illustrating a method of active backtracking.

Referring now to FIG. 8, a method for active backtracking is provided. At step 100, the NCU 58 monitors or queries whether all module strings 40, 42, 44 of each tracker 12a, 12b have voltage and current measurements within an acceptable predetermined range. If so, then the NCU 58 continues normal operation at step 102, which may include tilting the table 14 of one or more trackers 12a, 12b to theoretical optimum orientations, for example. Otherwise, the NCU 58 queries whether all module strings 40, 42, 44 of the underperforming tracker 12a, 12b have similar voltage and current measurements to each other at step 104. If so, then the NCU 58 continues normal operation at step 102. Otherwise, the NCU 58 queries whether the present time of day is in the morning or afternoon/evening at step 106.

If at step 106 the present time of day is in the morning, then the NCU 58 queries whether the easternmost string(s) 42/44 of the underperforming tracker 12a, 12b have a lower current and/or voltage than the remaining string(s) 40/42 of the underperforming tracker 12a, 12b at step 108. If not, then the NCU 58 sends a notice to the system operator at step 110 and continues normal operation at step 102. The notice may indicate that the entire underperforming tracker 12a, 12b is either shaded by an external object (e.g., cloud cover) or is experiencing an internal failure, for example. The notice may prompt the system operator to perform troubleshooting to determine the cause of the reduced current and/or voltage of the underperforming tracker 12a, 12b and/or take other action to resolve the issue. Otherwise, the NCU 58 infers that the modules 16 of the adjacent tracker 12b directly to the east of the underperforming tracker 12a are casting shade onto the easternmost string(s) 44 of the underperforming tracker 12a, and sends a signal to the motor 18 of the adjacent tracker 12b directly to the east of the underperforming tracker 12a instructing the motor 18 to rotate the respective table 14 to a flatter orientation to mitigate or eliminate the shading at step 112. The NCU 58 then continues normal operation at step 102.

If at step 106 the present time of day is in the afternoon/evening, then the NCU 58 queries whether the westernmost string(s) 40/42 of the underperforming tracker 12a, 12b have a lower current and/or voltage than the remaining string(s) 42/44 of the underperforming tracker 12a, 12b at step 114. If not, then the NCU 58 sends a notice to the system operator at step 110 and continues normal operation at step 102. The notice may indicate that the entire underperforming tracker 12a, 12b is either shaded by an external object (e.g., cloud cover) or is experiencing an internal failure, for example. The notice may prompt the system operator to perform troubleshooting to determine the cause of the reduced current and/or voltage of the underperforming tracker 12a, 12b and/or take other action to resolve the issue. Otherwise, the NCU 58 infers that the modules 16 of the adjacent tracker 12a directly to the west of the underperforming tracker 12b are casting shade onto the westernmost string(s) 40/42 of the underperforming tracker 12b, and sends a signal to the motor 18 of the adjacent tracker 12a directly to the west of the underperforming tracker 12b instructing the motor 18 to rotate the respective table 14 to a flatter orientation to mitigate or eliminate the shading at step 116. The NCU 58 then continues normal operation at step 102.

During the course of normal operation performed at step 102, the NCU 58 may continuously or incrementally monitor or query whether all module strings of each tracker have voltage and current measurements within an acceptable range at step 100, and rotate the tables of the various trackers as appropriate to mitigate or eliminate shading at step 112 and/or step 116.

Figure 9:
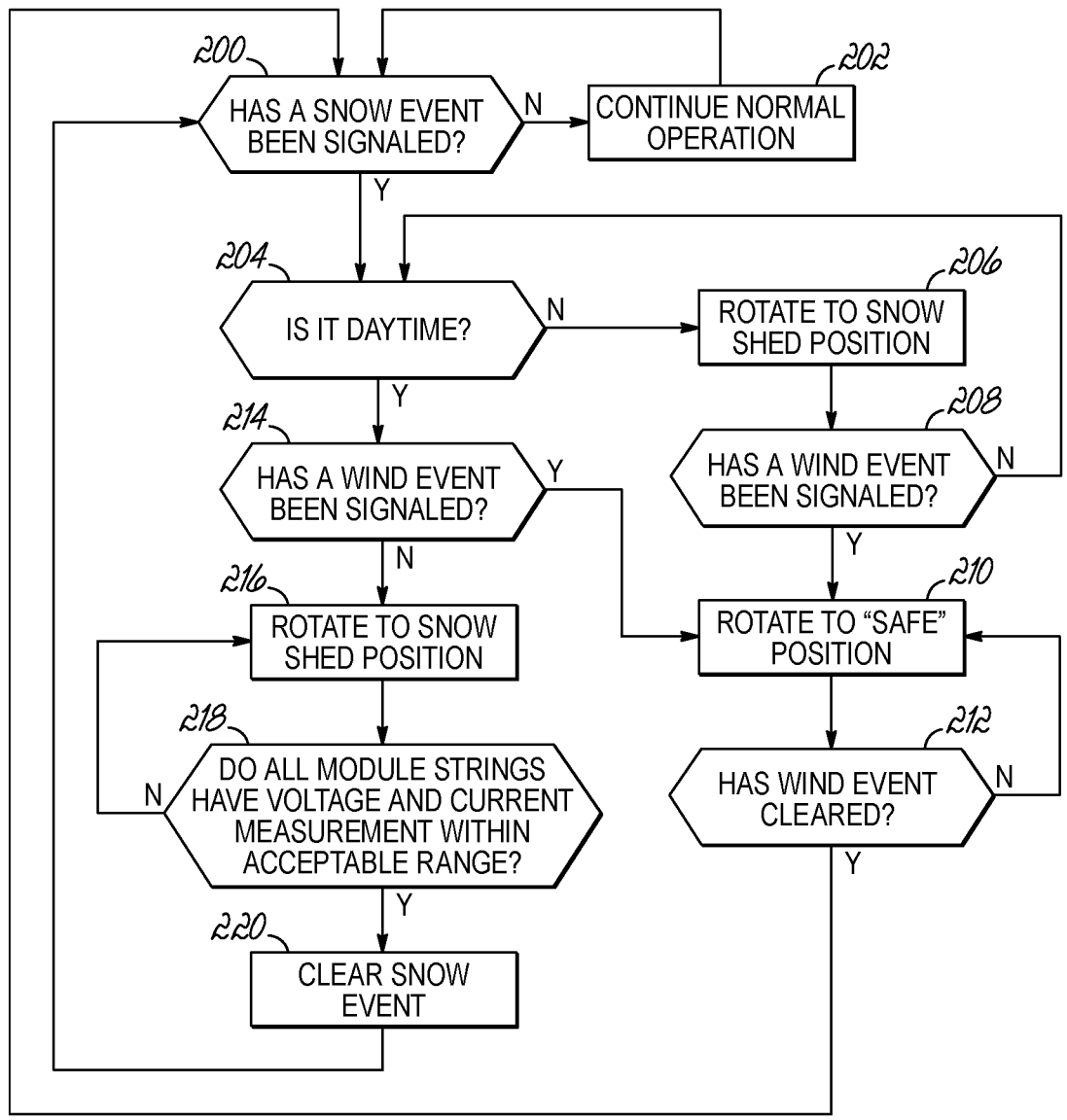
FIG. 9 is a flow diagram illustrating a method of active snow shedding.

Referring now to FIG. 9, a method for active snow shedding is provided. At step 200, the NCU 58 monitors or queries whether a snow event has been signaled by the snow event sensor 90. If not, then the NCU 58 continues normal operation at step 202, which may include tilting the table 14 of one or more trackers 12a, 12b to theoretical optimum orientations, for example. Otherwise, the NCU 58 queries whether the present time is during daytime at step 204.

If at step 204 the present time is not during daytime, then the NCU 58 sends a signal to the motors 18 of the trackers 12a, 12b to rotate the respective tables 14 to the snow shed position (e.g., maximum tilt angle) at step 206. The NCU 58 then monitors or queries whether a wind event has been signaled by the wind event sensor 92 at step 208. If not, then the NCU 58 returns to step 204 to query whether the present time is during daytime. Otherwise, the NCU 58 sends a signal to the motors 18 of the trackers 12a, 12b to rotate the respective tables 14 to the safe stowed position at step 210. The NCU 58 then monitors or queries whether the wind event has cleared at step 212 (e.g., whether the wind event is no longer sensed by the wind event sensor 92). If not, then the NCU 58 maintains the tables 14 at the safe stowed position at step 210. Otherwise, the NCU 58 returns to step 200 to monitor or query whether a snow event has been signaled.

If at step 204 the present time is during the daytime, then the NCU 58 monitors or queries whether a wind event has been signaled by the wind event sensor 92 at step 214. If so, then the NCU 58 sends a signal to the motors 18 of the trackers 12a, 12b to rotate the respective tables 14 to the safe stowed position at step 210 and then monitors or queries whether the wind event has cleared at step 212 as set forth above. Otherwise, the NCU 58 sends a signal to the motors 18 of the trackers 12a, 12b to rotate the respective tables 14 to the snow shed position at step 216. The NCU 58 then monitors or queries whether all module strings 40, 42, 44 have voltage and current measurements within an acceptable predetermined range at step 218. If not, then the NCU 58 maintains the tables 14 at the snow shed position at step 216. Otherwise, the NCU 58 clears the snow event at step 220 and returns to step 200 to monitor or query whether a snow event has been signaled by the snow event sensor 90.

During the course of normal operation performed at step 202, the NCU 58 may continuously or incrementally monitor or query whether a snow event has been signaled at step 200, rotate the tables 14 of the various trackers 12a, 12b as appropriate to shed snow accumulation at step 206 and/or step 216, and monitor or query whether all module strings 40, 42, 44 of each tracker 12a, 12b have voltage and current measurements within an acceptable range during daytime at step 218.

While the illustrated trackers 12*a*, 12*b* each include a single table 14 rotatable via the respective motor 18 and driveshaft 30, it will be appreciated that the trackers 12*a*, 12*b* may each include any number of individual tables 14 or other rotatable portions which may be linked together by a common driveshaft 30 such that the tables 14 of each tracker 12*a*, 12*b* may rotate together. For example, each tracker 12*a*, 12*b* may include 10 tables 14 linked together by a driveshaft 30. In one embodiment, each tracker 12*a*, 12*b* may have a length of approximately 300 feet. While the TCUs 20 and NCU 58 are illustrated as separate and distinct components in operative communication with each other, any other suitable controller architecture may be used. For example, one or more of the TCUs 20 and NCU 58 may be integrated into a single controller.

While the modules strings 40, 42, 44 described above each include entire modules 16, it will be appreciated that in some embodiments one or more strings 40, 42, 44 may include only portions of modules 16. For example, in embodiments where each module is populated with half cells arranged into independent upper and lower module halves, a first string may be defined by the upper module halves electrically coupled to each other in a series configuration, and a second string may be defined by the lower module halves electrically coupled to each other in a series configuration. This may enable more precise monitoring of electrical output.

Figure 10:
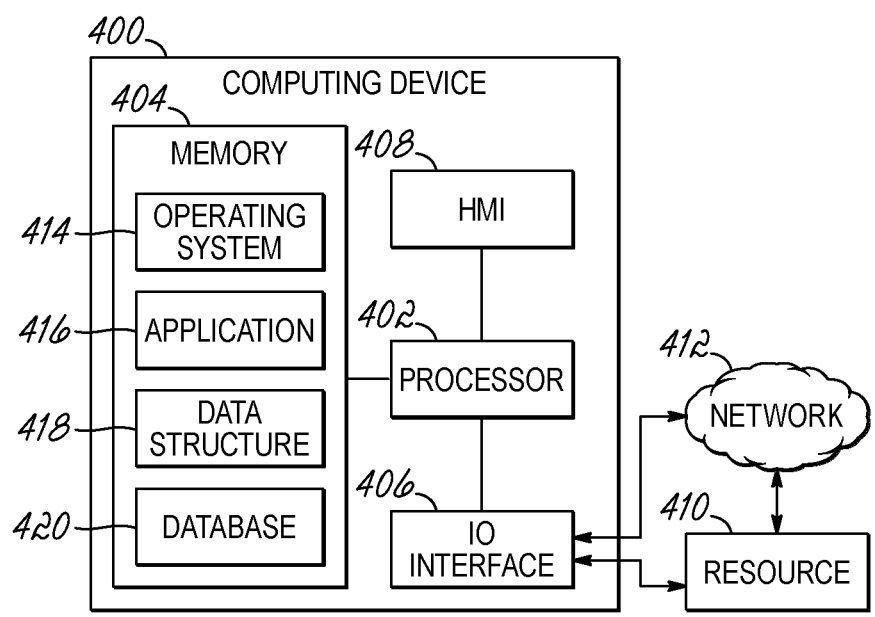
FIG. 10 is a diagrammatic view of a computer that may be used to implement one or more of the components and/or processes described herein.

Referring now to FIG. 10, embodiments of the invention described above, or portions thereof, may be implemented using one or more computer devices or systems, such as exemplary computer 400. The computer 400 may include a processor 402, a memory 404, an input/output (I/O) interface 406, and a Human Machine Interface (HMI) 408. The computer 400 may also be operatively coupled to one or more external resources 410 via the network 412 and/or I/O interface 406. External resources may include, but are not limited to, servers, databases, mass storage devices, peripheral devices, cloud-based network services, or any other resource that may be used by the computer 400.

The processor 402 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 404. Memory 404 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 402 may operate under the control of an operating system 414 that resides in memory 404. The operating system 414 may manage computer resources so that computer program code embodied as one or more computer software applications, such as an application 416 residing in memory 404, may have instructions executed by the processor 402. In an alternative embodiment, the processor 402 may execute the application 416 directly, in which case the operating system 414 may be omitted. One or more data structures 418 may also reside in memory 404, and may be used by the processor 402, operating system 414, or application 416 to store or manipulate data.

The I/O interface 406 may provide a machine interface that operatively couples the processor 402 to other devices and systems, such as the external resource 410 or the network 412. The application 416 may thereby work cooperatively with the external resource 410 or network 412 by communicating via the I/O interface 406 to provide the various features, functions, applications, processes, or modules comprising embodiments of the invention. The application 416 may also have program code that is executed by one or more external resources 410, or otherwise rely on functions or signals provided by other system or network components external to the computer 400. Indeed, given the nearly endless hardware and software configurations possible, persons having ordinary skill in the art will understand that embodiments of the invention may include applications that are located externally to the computer 400, distributed among multiple computers or other external resources 410, or provided by computing resources (hardware and software) that are provided as a service over the network 412, such as a cloud computing service.

The HMI 408 may be operatively coupled to the processor 402 of computer 400 in a known manner to allow a user to interact directly with the computer 400. The HMI 408 may include video or alphanumeric displays, a touch screen, a speaker, and any other suitable audio and visual indicators capable of providing data to the user. The HMI 408 may also include input devices and controls such as an alphanumeric keyboard, a pointing device, keypads, pushbuttons, control knobs, microphones, etc., capable of accepting commands or input from the user and transmitting the entered input to the processor 402.

A database 420 may reside in memory 404, and may be used to collect and organize data used by the various systems and modules described herein. The database 420 may include data and supporting data structures that store and organize the data. In particular, the database 420 may be arranged with any database organization or structure including, but not limited to, a relational database, a hierarchical database, a network database, or combinations thereof. A database management system in the form of a computer software application executing as instructions on the processor 402 may be used to access the information or data stored in records of the database 420 in response to a query, which may be dynamically determined and executed by the operating system 414, other applications 416, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A solar tracking system comprising:
   a first solar tracker including:
      a first rotatable portion including a first plurality of solar modules, at least a portion of each of the modules of the first plurality of modules being arranged in a first row and electrically coupled to each other in series to define at least one first string;
      a first motor operatively coupled to the first rotatable portion and configured to supply torque to the first rotatable portion for rotating the first rotatable portion about a first axis; and
      at least one first sensor configured to detect at least one first electrical characteristic of the at least one first string;
   a second solar tracker positioned substantially parallel to the first solar tracker and including:
      a second rotatable portion including a second plurality of solar modules, at least a portion of each of the modules of the second plurality of modules being arranged in a second row and electrically coupled to each other in series to define at least one second string;
      a second motor operatively coupled to the second rotatable portion and configured to supply torque to the second rotatable portion for rotating the second rotatable portion about a second axis; and
      at least one second sensor configured to detect at least one second electrical characteristic of the at least one second string; and
   at least one controller in operative communication with the first and second motors and with the at least one first and second sensors, wherein the at least one controller is configured to instruct the first motor to supply torque to the first rotatable portion in response to one or more signals received by the at least one controller from the at least one second sensor, and wherein the at least one controller is configured to instruct the second motor to supply torque to the second rotatable portion in response to one or more signals received by the at least one controller from the at least one first sensor.

2. The solar tracker system of claim 1, wherein at least one of the at least one first electrical characteristic sensor and the at least one second electrical sensor includes at least one of a voltage sensor or a current sensor.

3. The solar tracker system of claim 2, further comprising:
   at least one solar power inverter electrically coupled to the at least one of the at least one first string and the at least one second string and configured to change a current output of the at least one of the at least one first string and the at least one second string from direct current (DC) to alternating current (AC), wherein the at least one solar power inverter includes the at least one of a voltage sensor or a current sensor.

4. The solar tracker system of claim 1, wherein the at least one controller is configured to perform a comparison of the detected first and second electrical characteristics and to instruct the motor to supply torque to the first or second rotatable portion in response to the comparison.

5. The solar tracker system of claim 1, further comprising:
at least one sunlight intensity sensor configured to detect a sunlight intensity proximate at least one of the at least one first string and the at least one second string,
wherein the at least one controller is configured to perform a comparison of the detected first and second electrical characteristics and the detected sunlight intensity and to instruct the motor to supply torque to the first or second rotatable portion in response to the comparison.

6. The solar tracker system of claim 5, wherein the at least one sunlight intensity sensor includes an irradiance sensor.

7. The solar tracker system of claim 1, wherein at least one of the first and second rotatable portions further includes a table, and wherein at least one of the first and second plurality of solar modules are mounted on the table.

8. The solar tracker system of claim 7, wherein the table includes a driveshaft defining the axis, and wherein the motor is operatively coupled to the driveshaft and configured to supply torque to the driveshaft for rotating the table about the axis.

9. The solar tracking system of claim 1, wherein the at least one controller is configured to instruct the first motor to supply torque to the first rotatable portion in response to one or more signals received by the at least one controller from the at least one first sensor, and wherein the at least one controller is configured to instruct the second motor to supply torque to the second rotatable portion in response to one or more signals received by the at least one controller from the at least one second sensor.

* * * * *